United States Patent

[11] 3,596,340

| [72] | Inventor | Paul V. Costa |
| | | Peabody, Mass. |
| [21] | Appl. No. | 867,469 |
| [22] | Filed | Oct. 20, 1969 |
| [45] | Patented | Aug. 3, 1971 |
| [73] | Assignee | The Gillette Company |
| | | Boston, Mass. |

[54] COMPONENT ASSEMBLY APPARATUS
25 Claims, 29 Drawing Figs.

| [52] | U.S. Cl. | 29/208 R, 29/211 |
| [51] | Int. Cl. | B23p 19/04, B23q 7/10 |
| [50] | Field of Search | 29/208 R, 211 R, 208 I, 211 D, 208 C |

[56] References Cited
UNITED STATES PATENTS

| 2,192,106 | 2/1940 | Ross et al. | 29/208 X |
| 2,431,279 | 11/1947 | Remington et al. | 29/208 X |

Primary Examiner—Thomas H. Eager
Attorney—Willis M. Ertman

ABSTRACT: Apparatus for the assembly of components which require a small temporary rotation for proper assembly (e.g., an adjustment lever and guide plate of a variable geometry mechanism for a razor blade magazine) comprising a turret having, at symmetrically spaced fixed positions about its periphery, eight nest elements thereon; a first machine station at which clamping jaws of the nest element are opened and into which are deposited by an operative head at that station an adjustment lever; a second machine station at which a magazine is deposited over the adjustment lever by an operative head; a third station at which an operative head receives a guide plate from a feeder mechanism, transfers the guide plate to the nest element, and engages the guide plate with a protruding portion of the adjustment lever by means of a small (8°) temporary rotation of the operative head and guide plate; a plurality of machine stations which perform tests to determine the structural soundness of the magazine and the proper assembly of the guide plate; and a final machine station for removal of the assembled magazine from the nest element.

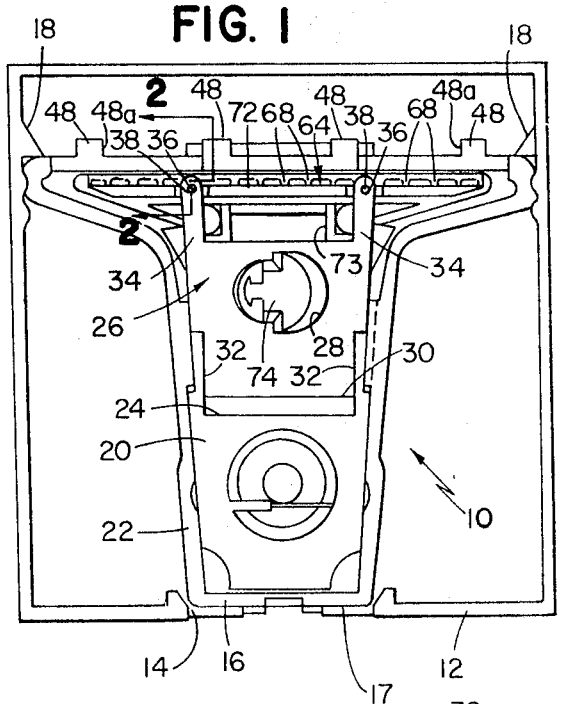
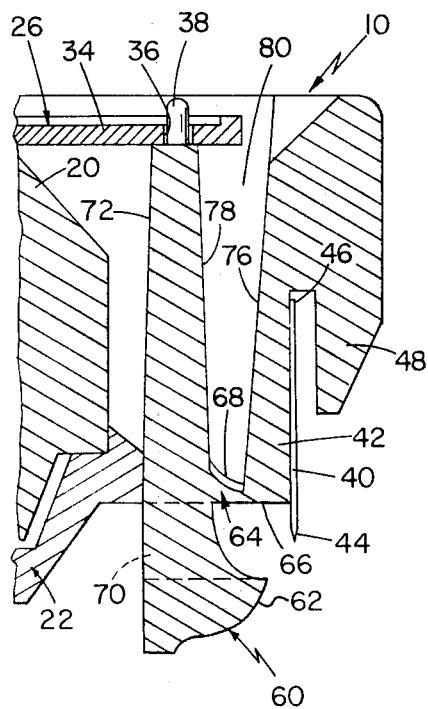
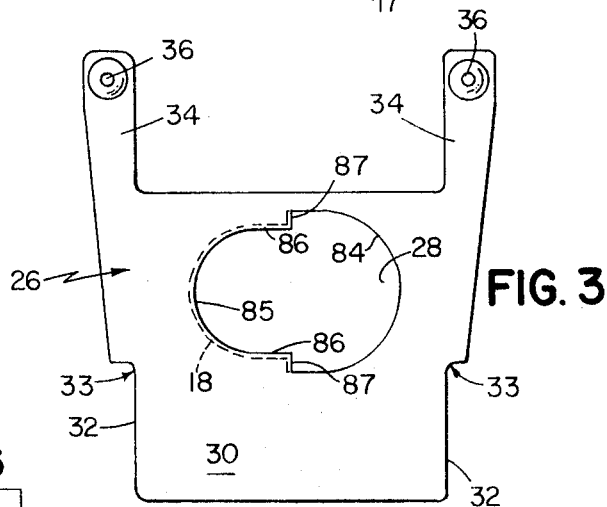
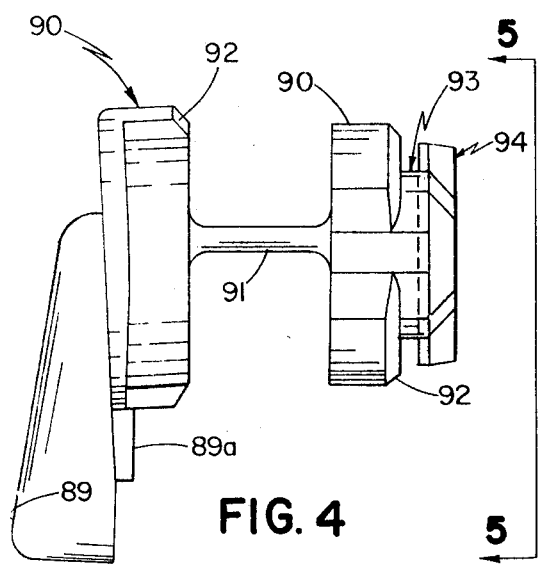
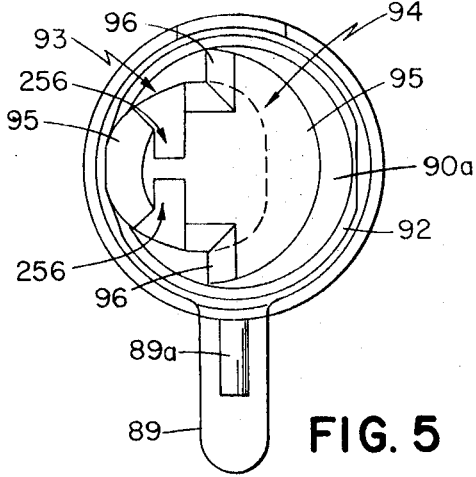

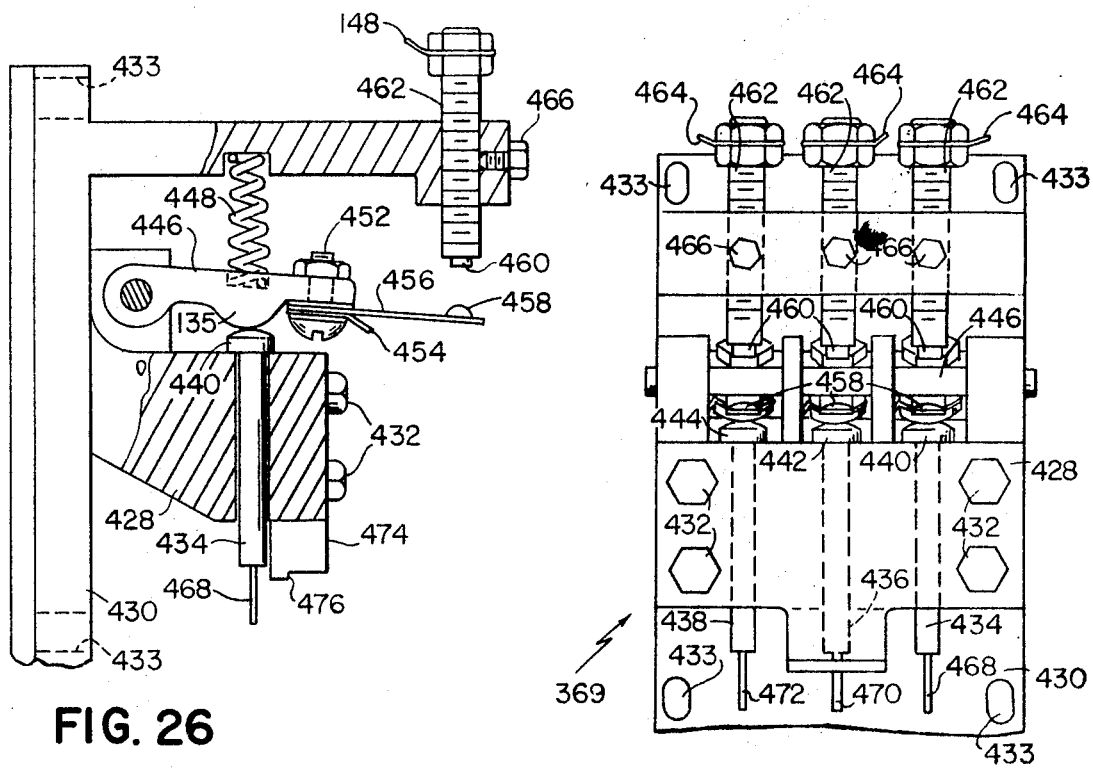
FIG. 26
FIG. 27
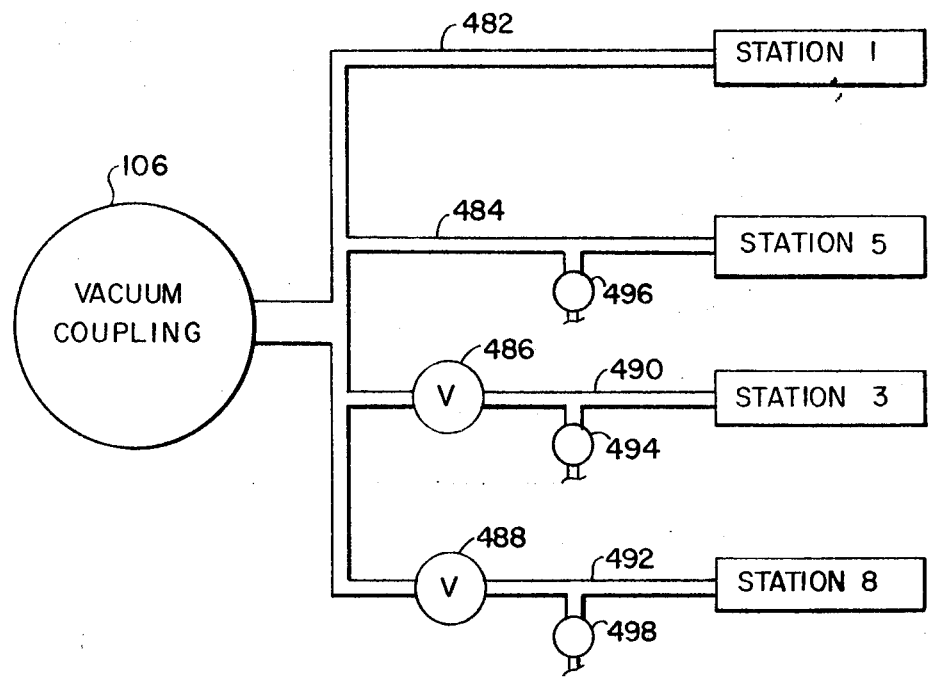
FIG. 28

COMPONENT ASSEMBLY APPARATUS

SUMMARY OF THE INVENTION

This invention relates to apparatus for the assembly of components which require a small temporary relative rotation for proper assembly.

It is an object of the invention to provide such apparatus which is of efficient and economical construction.

It is a further object of the invention to provide an automatic apparatus for such rotative assembly of components which is capable of rapid rate assembly.

In accordance with the invention the apparatus features a clamping mechanism for clamping the first component in an orientation such that a latching structure on the first component is exposed. An assembly head is provided which is mounted for movement between locations adjacent to and remote from the clamping mechanism and for rotation about a pivot axis. The assembly head is rotatively biased and is constructed to support the second component in an orientation suitable for rotative assembly with the first component. The assembly head includes a pivoted actuator arm which is mounted so as to strike a fixed deflection member as the head moves between the remote and adjacent locations and thereby to cause a rotation of the assembly head, as well as the second component, about the pivot axis. A locking member cooperates with actuator arm biasing means to pivot the actuator arm away from the deflection member after a predetermined angle of rotation of the assembly head and second component.

The apparatus is especially suited for the assembly of razor blade magazines which include a variable shaving geometry feature, the components to be assembled being an adjustment lever, a guide plate, and a partially preassembled razor blade magazine. In this form the apparatus preferably includes a turret mounted for rotation and means for rotating the turret to predetermined rotational orientations. At least one nest element is mounted upon the turret and is constructed to receive and to retain in predetermined orientations, which are fixed with respect to both the turret and the nest element, an adjustment lever and a partially preassembled magazine. Four operative stations are provided at locations which are fixed relative to the turret and which are adjacent the locations of the nest element when the turret is in one of the predetermined rotational orientations. These operative stations include pivoted arms mounted for both vertical motion with respect to the nest element and for angular motion between a position vertically aligned with the nest element and a second position remote from the nest element. At the remote position of the first, second, and third of the four pivoted arms there are provided feeder mechanisms for the continuous delivery of adjustment levers, partially preassembled magazines, and guide plates, respectively. Each of the four pivoted arms supports an operative head. The first operative head is constructed to receive an adjustment lever from the feeder mechanism and to transport it to the nest element. The second operative head is constructed to receive a partially preassembled magazine from the second feeder mechanism, to transport it to the nest element, and to deposit it in the nest element such that the adjustment lever protrudes from both ends of a channel provided in the magazine. The third operative head is constructed to receive a guide plate, to transport it to the nest element, and to engage it with a protruding portion of the adjustment lever by means of the rotative deflection and return of the operative head and guide plate relative to the adjustment lever. The fourth operative head is constructed to remove the fully assembled magazine from the nest element. In this automatic apparatus the third operative head is preferably rotatively biased and includes a pivoted actuator arm and locking element as discussed above.

In preferred embodiments of the automatic assembly apparatus for razor blade magazines there are a number of nest elements symmetrically mounted about the periphery of the turret, thus permitting the simultaneous action of each operative head on a different magazine. It is also preferred that testing heads be provided at testing stations between the third and fourth operative heads. This location of the testing stations permits the inspection of fully assembled razor blade magazines before they are removed from the nest assembly by the fourth operative head. In the preferred form of the apparatus which provides at least two such testing stations, tests for both proper assembly of the magazine and for defective magazine components may be carried out. There is then also provided means, which cooperate with the testing head that tests for a defectively assembled magazine, which serve to identify and segregate those magazines which have been defectively assembled. Means are also provided, which cooperate with the testing head that tests for defective magazine components, which identify magazines having such defective components and which can override the first mentioned means so as to segregate such magazines with defective components from both other categories of magazines (i.e., both correctly and incorrectly assembled magazines).

Other objects, features, and advantages will appear from the following description of a preferred embodiment of the invention, taken together with the attached drawings thereof. This description of a particular embodiment is in an illustrative and not a limiting sense as other embodiments of the invention will be apparent to those skilled in the art. In the drawings:

FIG. 1 is a plan view of a razor blade magazine of the type designed to be assembled by apparatus constructed according to the invention;

FIG. 2 is a magnified view taken at 2-2 of FIG. 1;

FIG. 3 is a detailed plan view of a component of the magazine of FIG. 1;

FIG. 4 is a detailed side elevation of another component of the magazine of FIG. 1;

Figure 6:
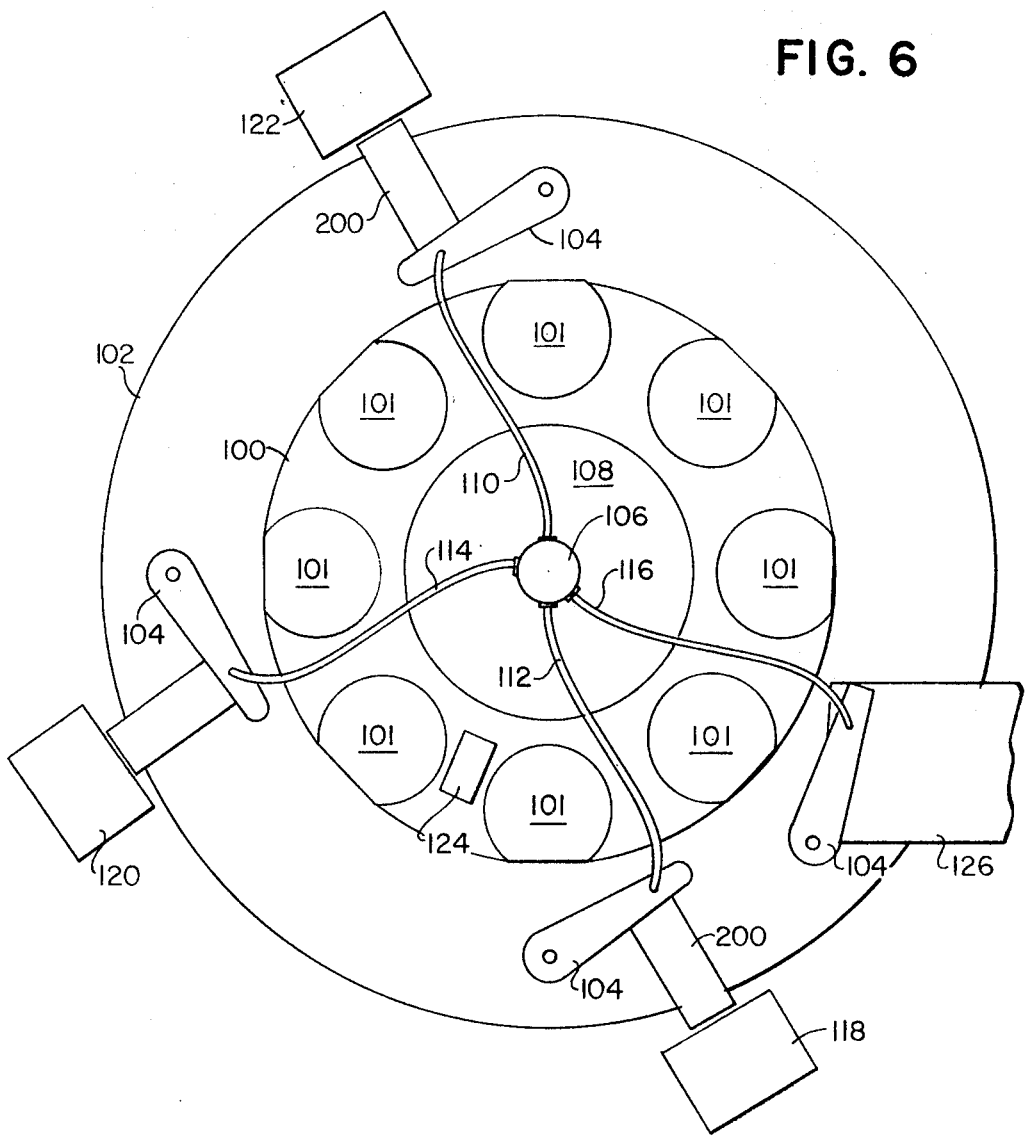
Figure 7:
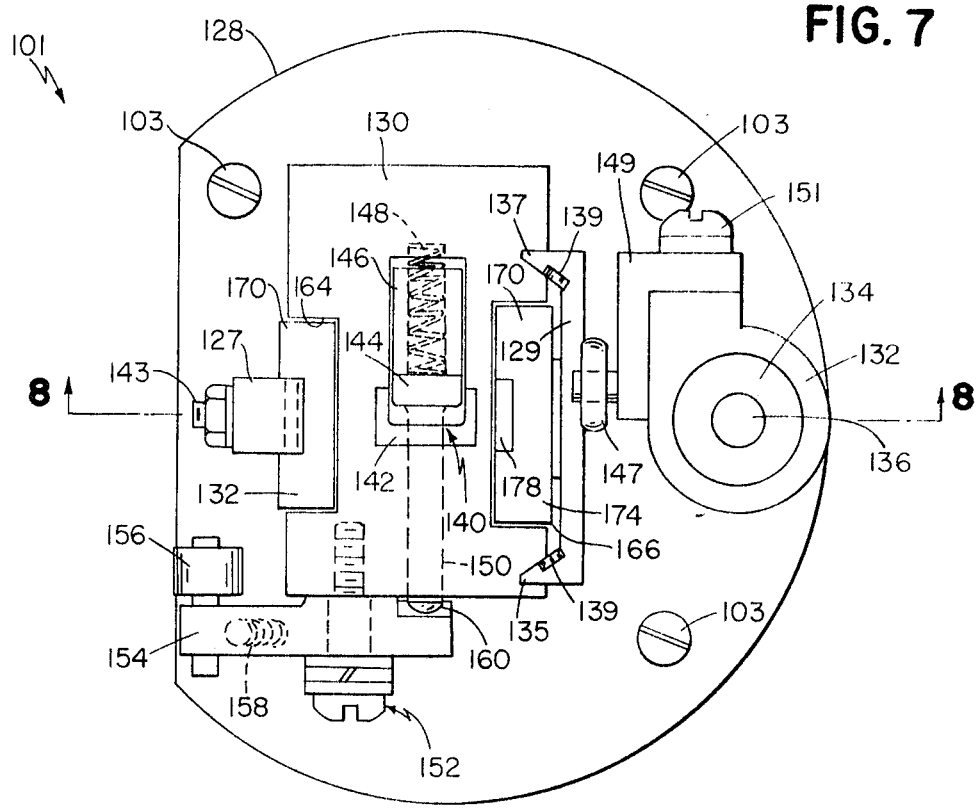
Figure 8:
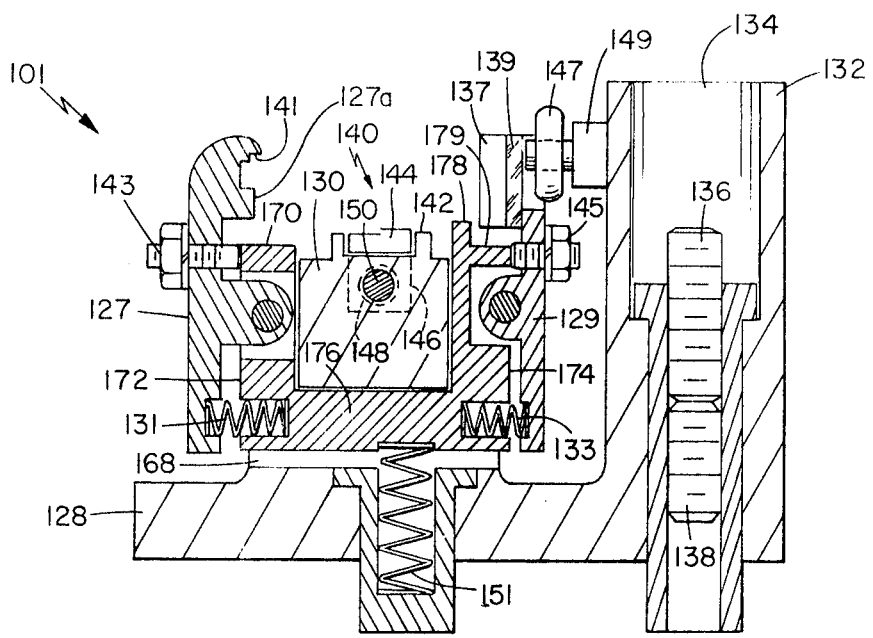
Figure 9:
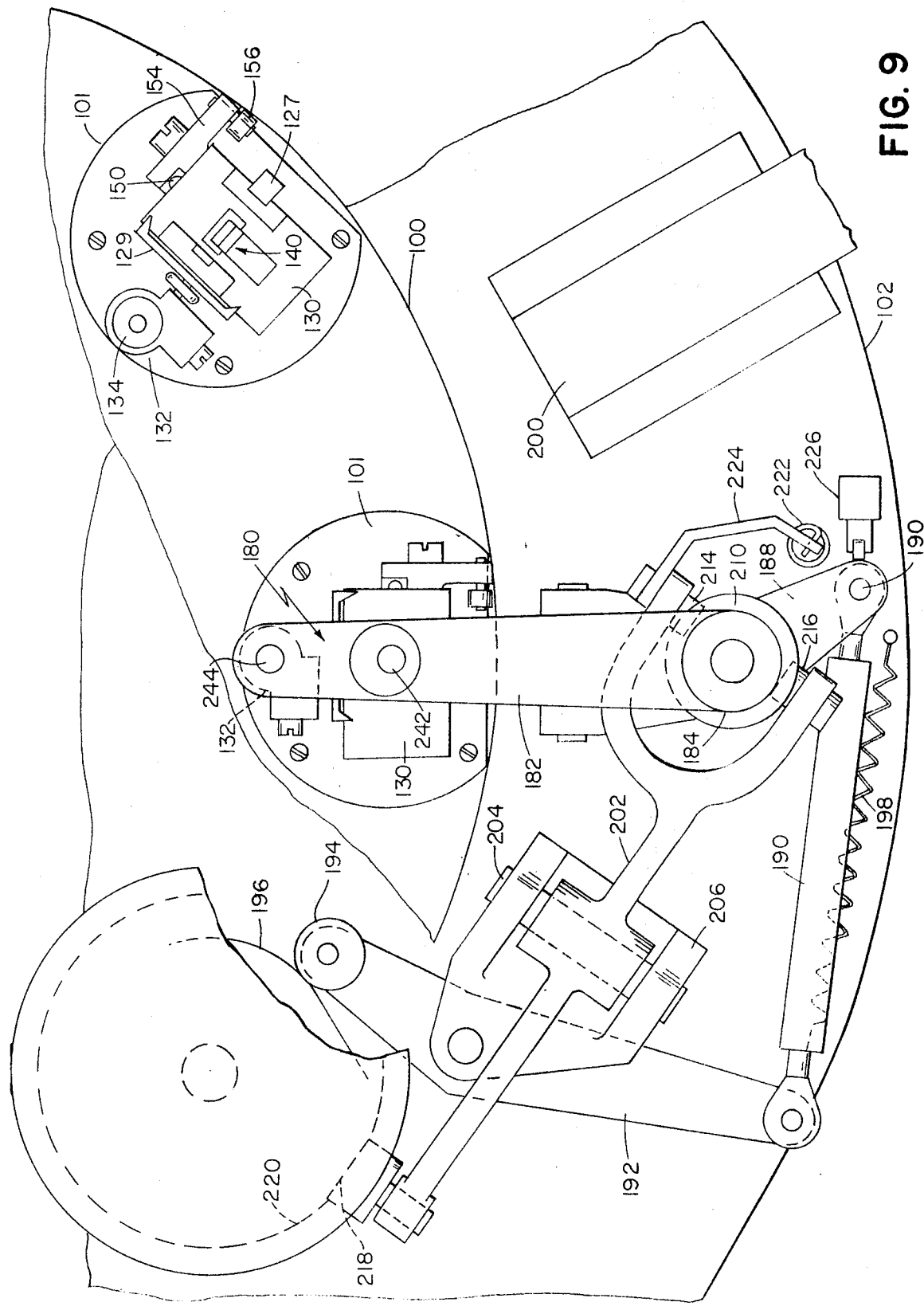
Figure 10:
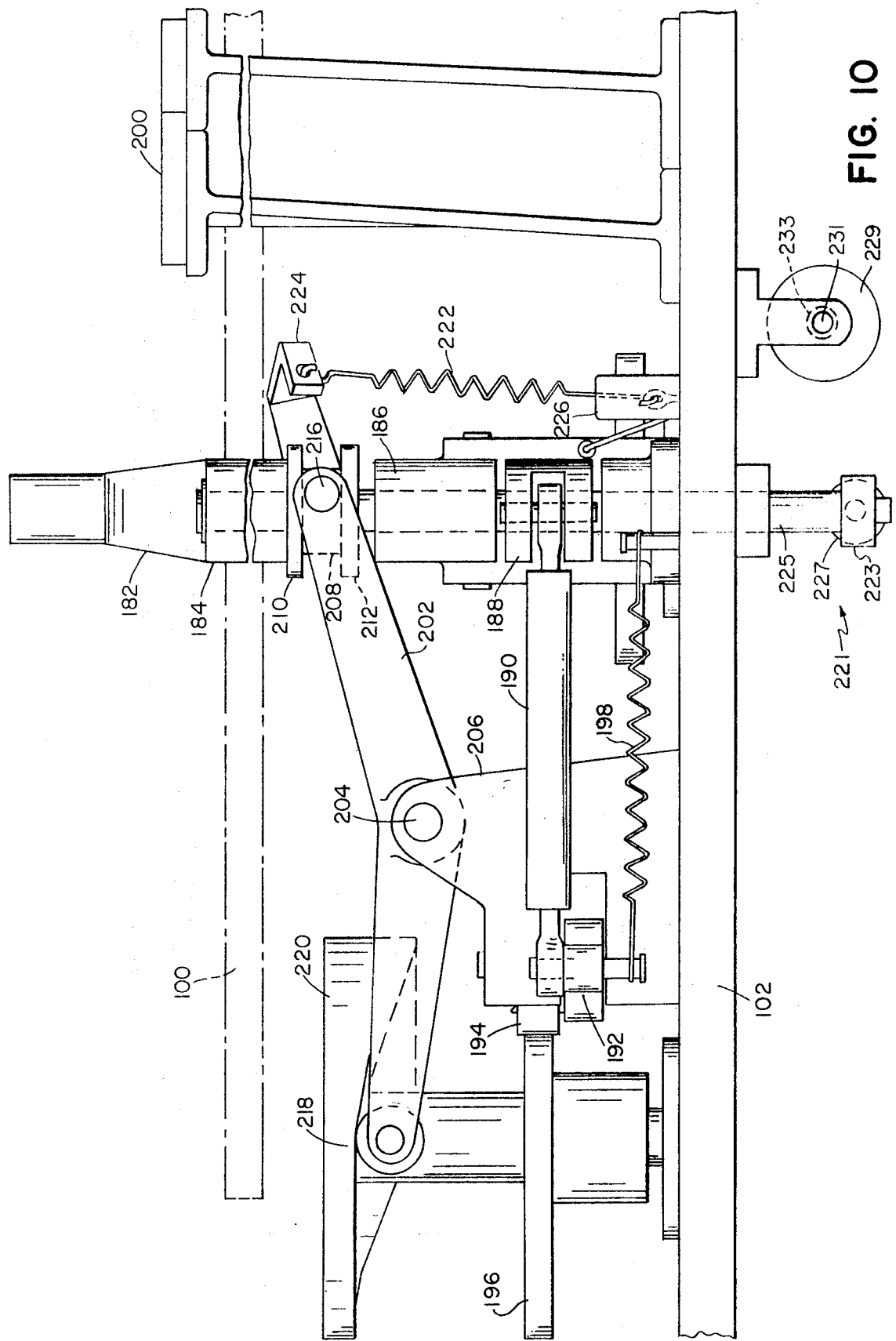
Figure 12:
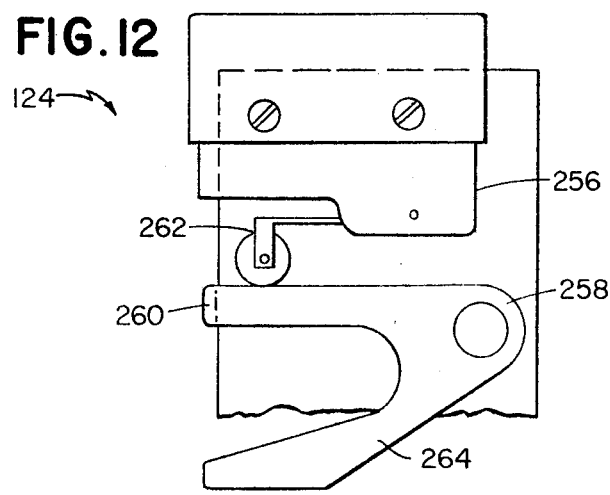
Figure 13:
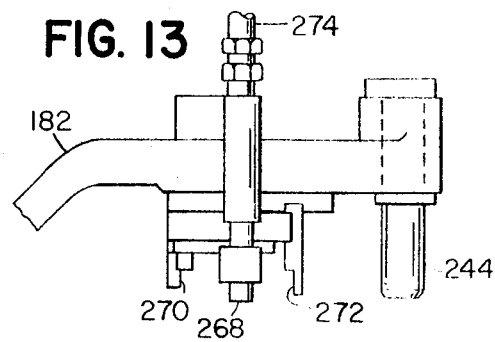
Figure 11:
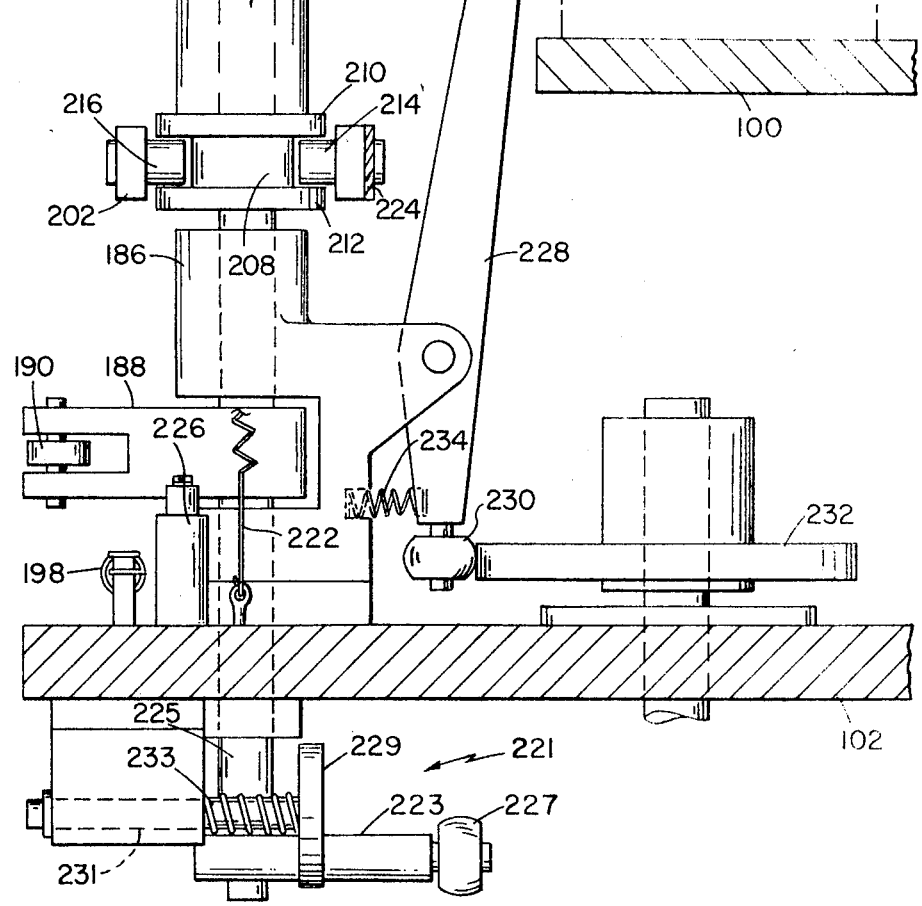
Figure 14:
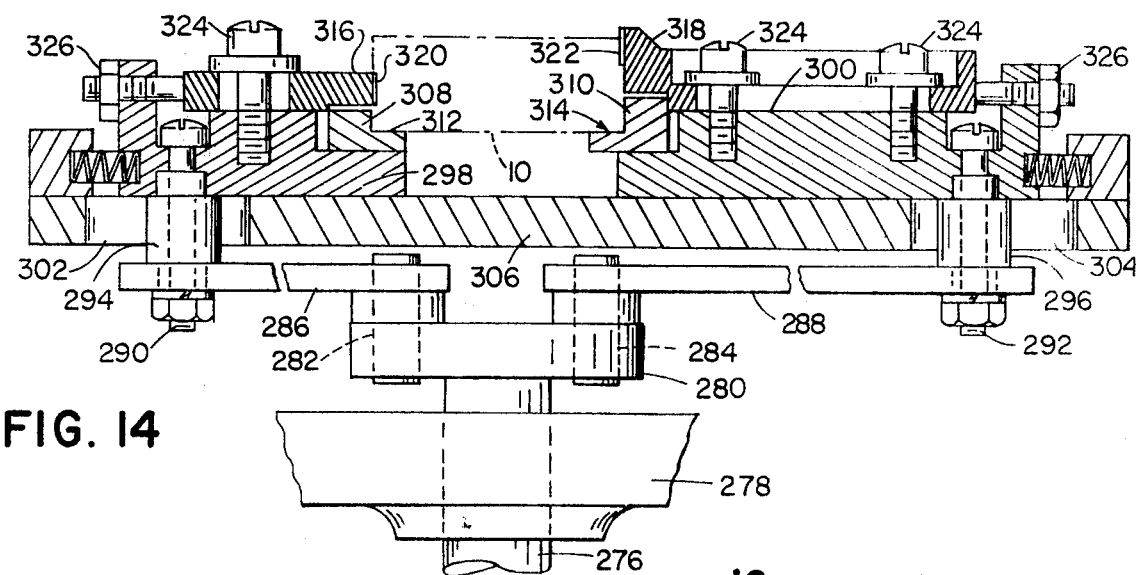
Figure 15:
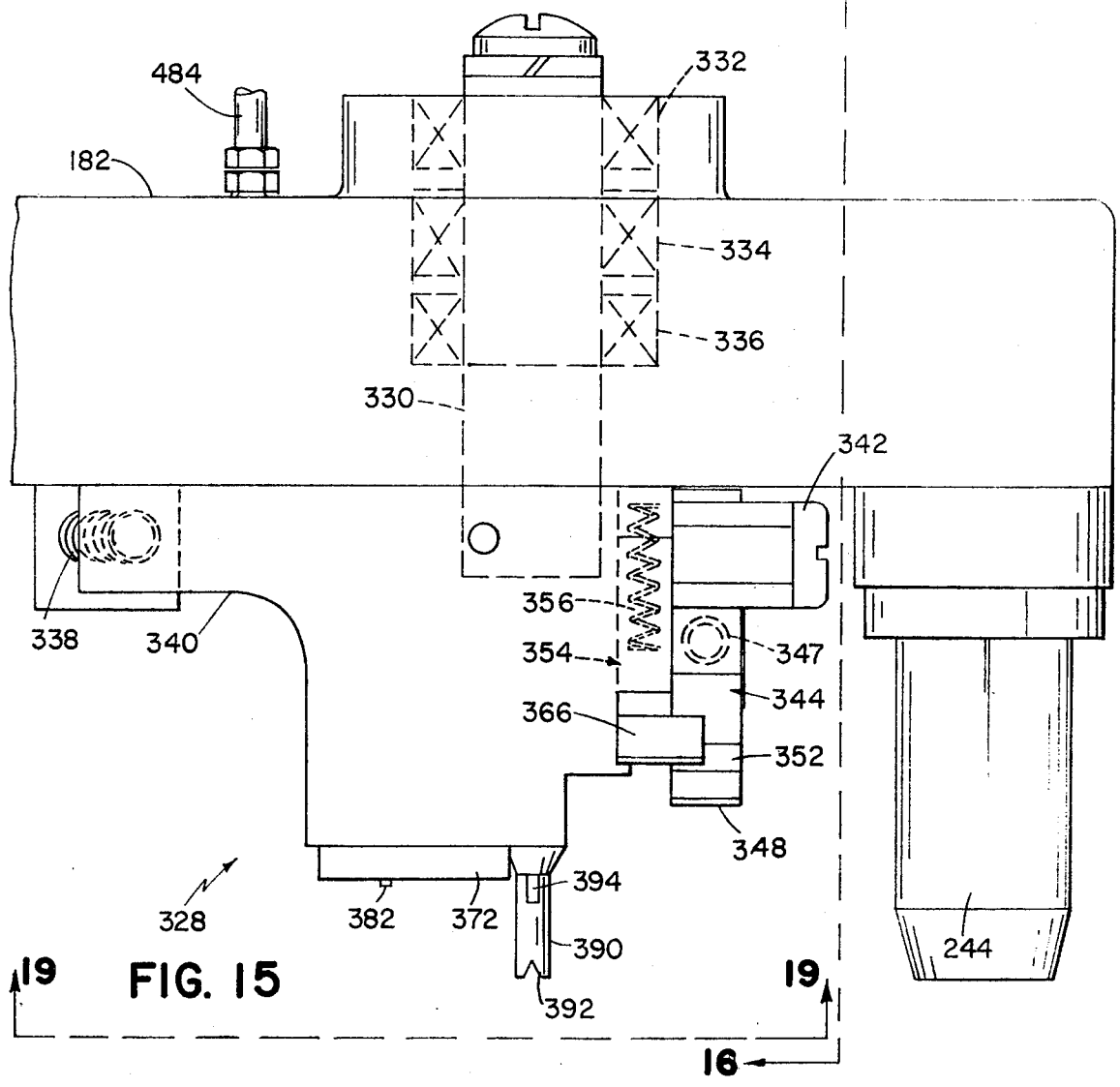
Figure 16:
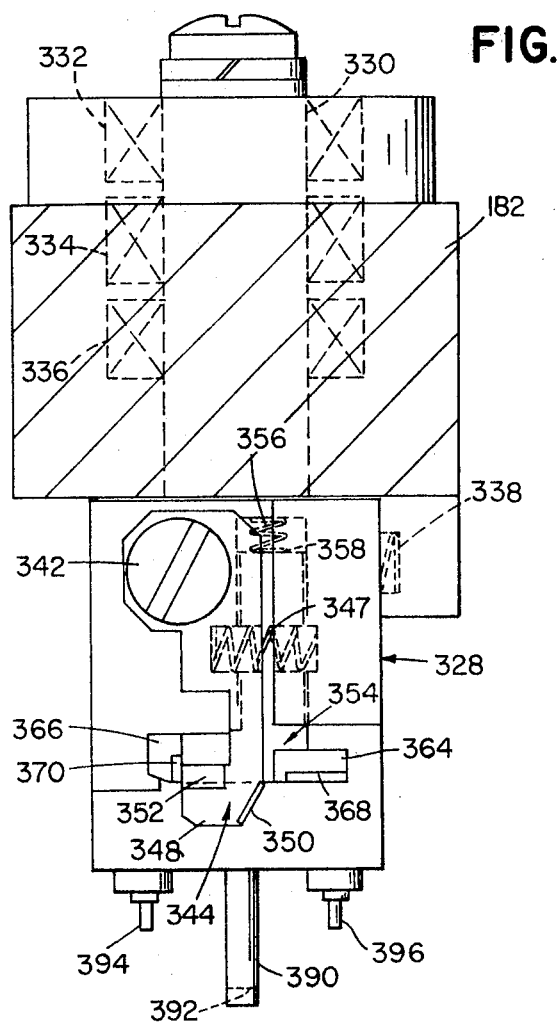
Figure 17:
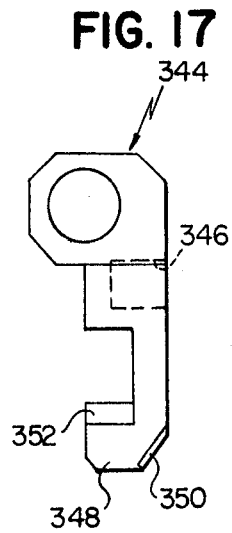
Figure 18:
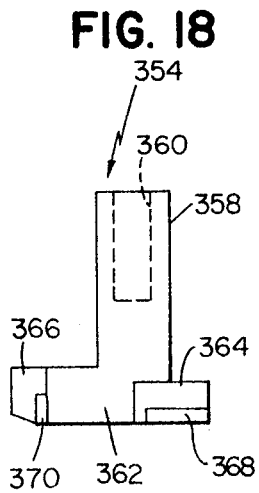
Figure 19:
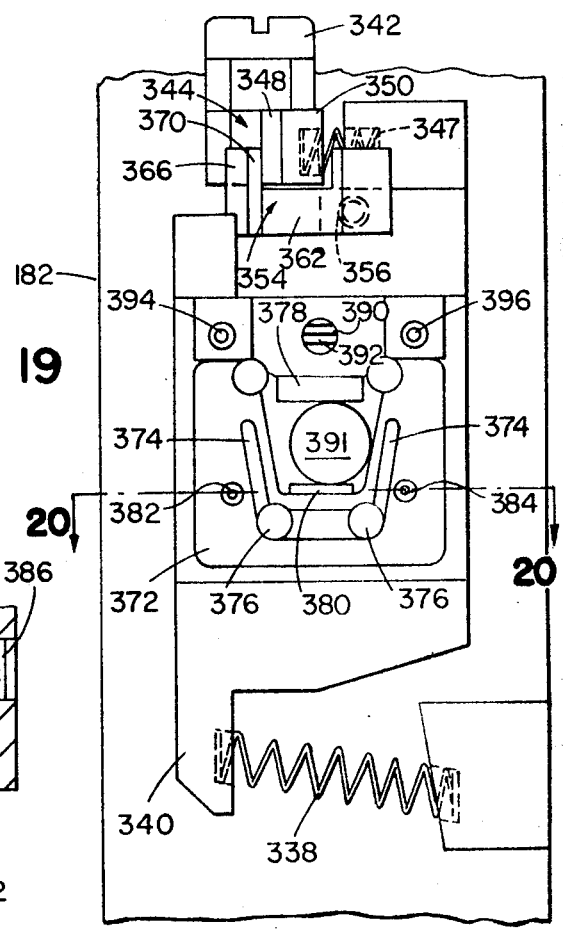
Figure 20:
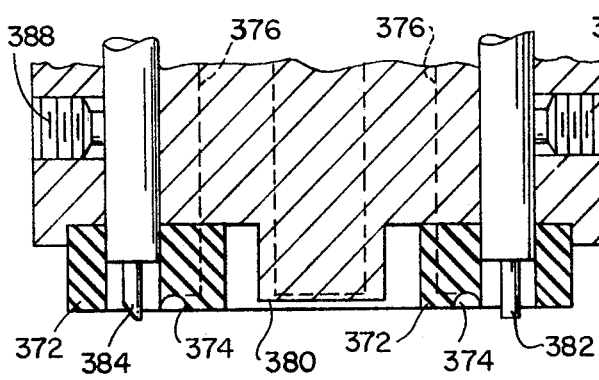
Figure 21:
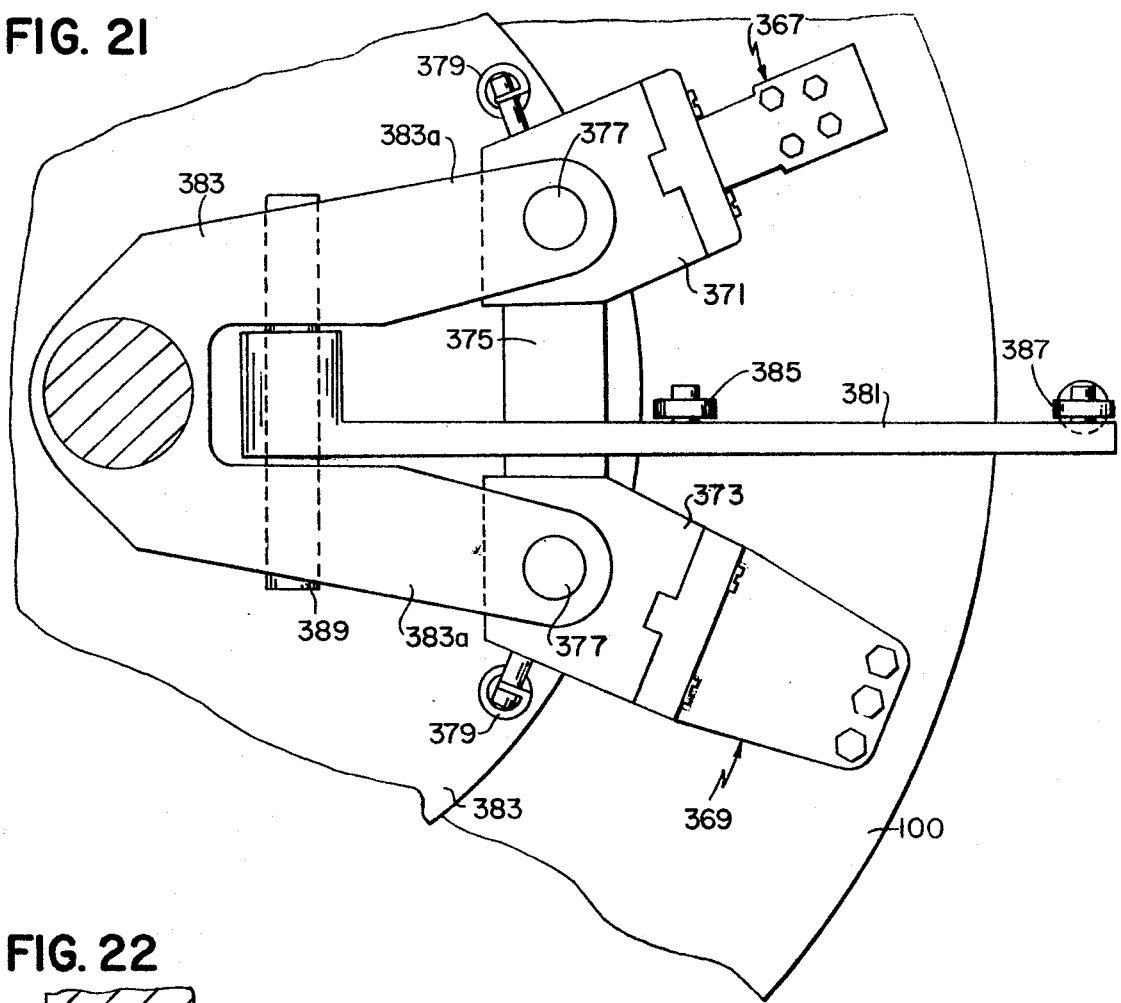
Figure 22:
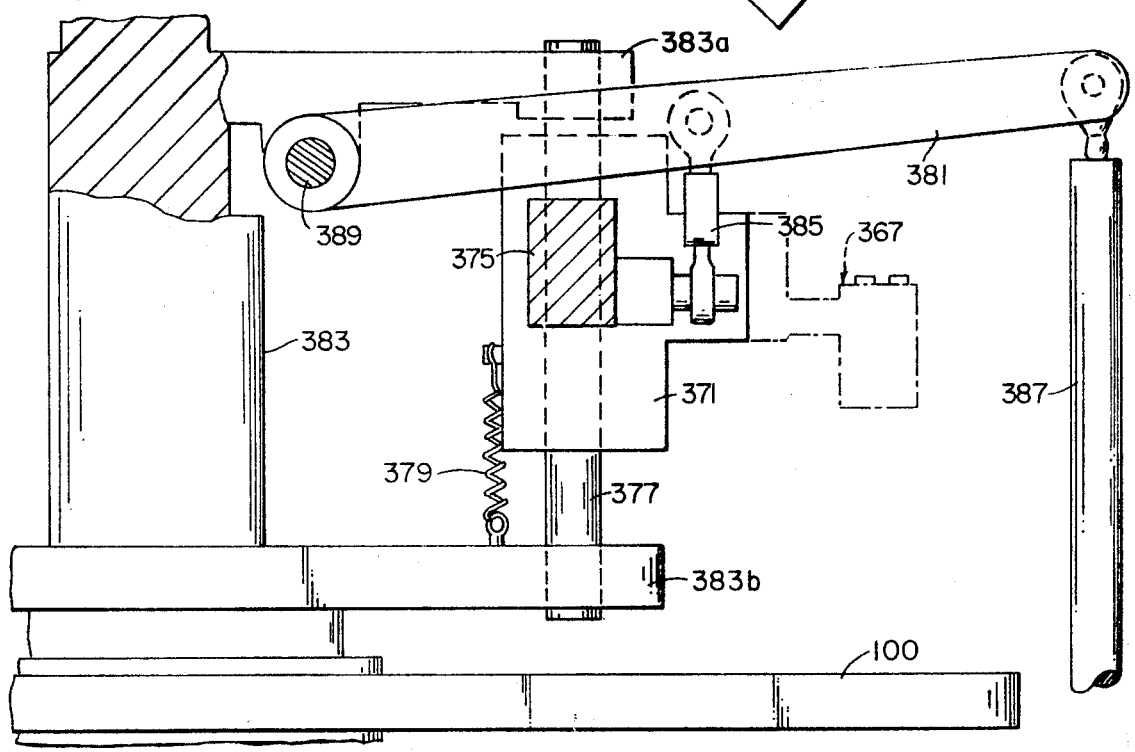
Figure 23:
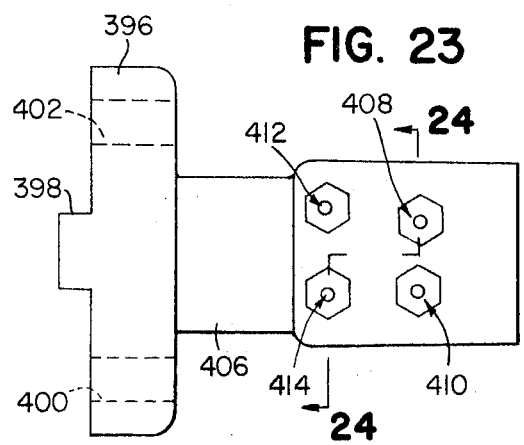
Figure 25:
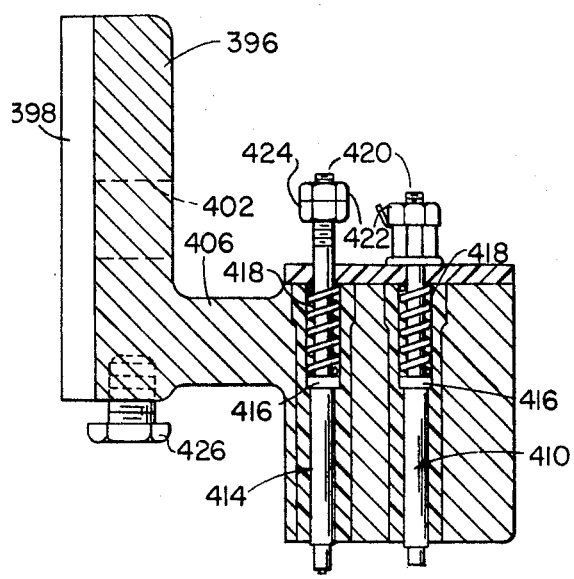
Figure 24:
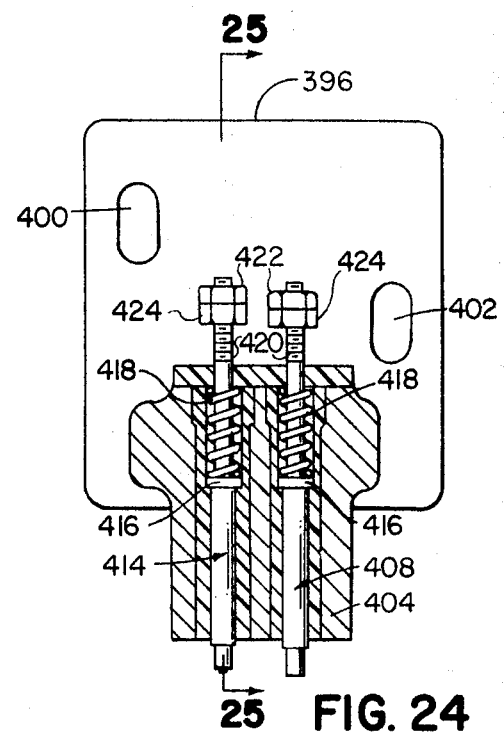
Figure 29:
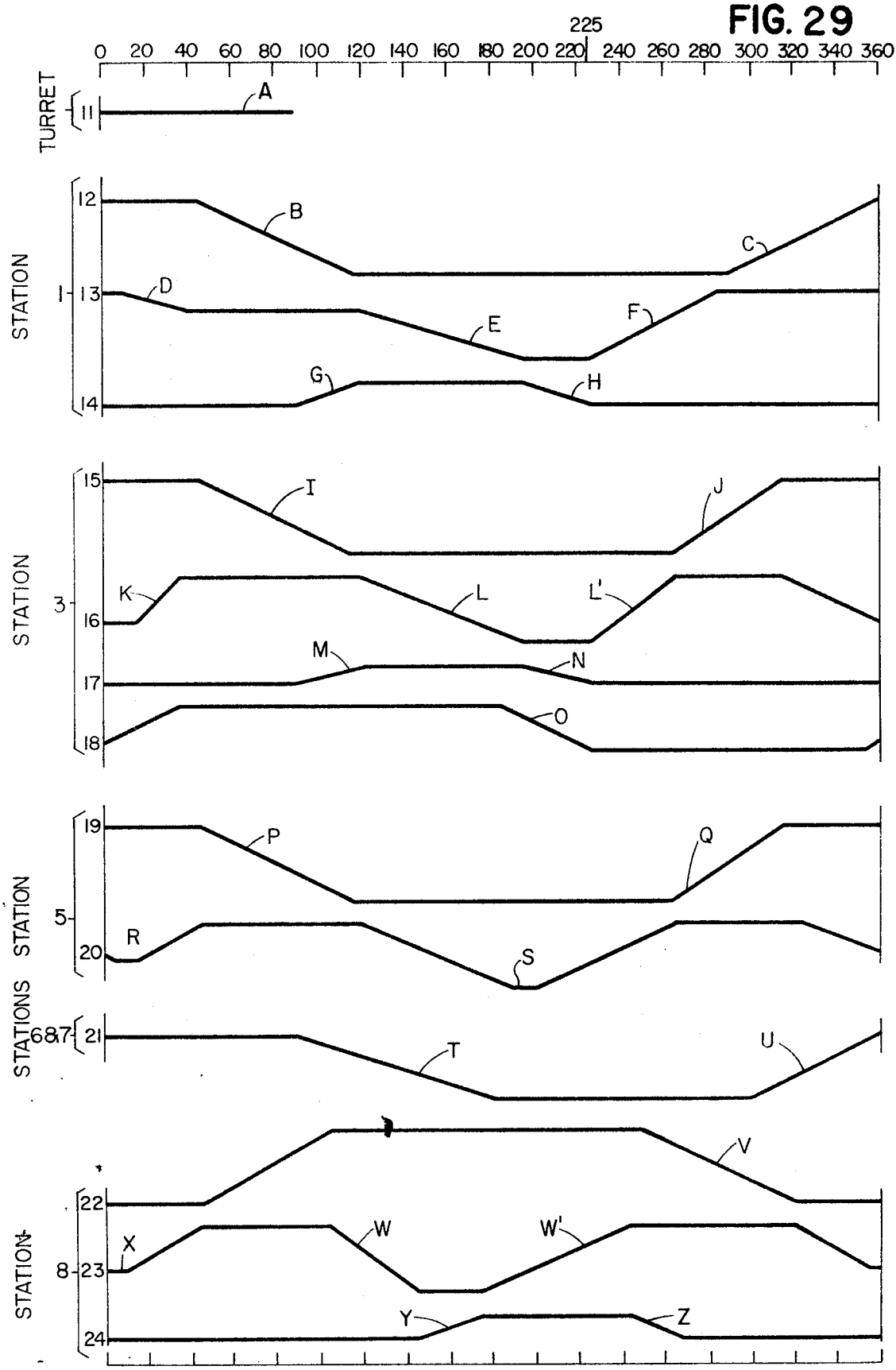

FIG. 5. is a rear elevation of the component of FIG. 4;

FIG. 6 is a diagrammatic plan view of the overall configuration of apparatus constructed according to the invention;

FIG. 7 is a plan view of a nest element of the apparatus of FIG. 6;

FIG. 8 is a section taken at 8-8 of FIG. 7;

FIG. 9 is a plan view of the configuration at station 1 of the apparatus of FIG. 6;

FIG. 10 is a front elevation of the station of FIG. 9;

FIG. 11 is a side elevation of the station of FIG. 9;

FIG. 12 is a front elevation of a portion of the apparatus of FIG. 6 which monitors the operation of the station of FIG. 9;

FIG. 13 is a side elevation of the operative head at station 3 of the apparatus of FIG. 6;

FIG. 14 is a sectional view of a device associated with station 3 of the apparatus of FIG. 6;

FIG. 15 is a side elevation of the operative head at station 5 of the apparatus of FIG. 6;

FIG. 16 is a view taken at 16-16 of FIG. 15;

FIG. 17 is a detailed front elevation of an element of the operative head of FIGS. 15 and 16;

FIG. 18 is a detailed front elevation of another element of the operative head of FIGS. 15 and 16;

FIG. 19 is a view taken at 19-19 of FIG. 15;

FIG. 20 is a magnified view taken at 20-20 of FIG. 19;

FIG. 21 is plan view of stations 6 and 7;

FIG. 22 is a partially broken away side elevation of the portion of the apparatus of FIG. 21;

FIG. 23 is a plan view of the testing head at station 6;

FIG. 24 is a partially broken away front elevation of the testing head of FIG. 23;

FIG. 25 is a section taken at 25-25 of FIG. 24;

FIG. 26 is a partially broken away side elevation of the testing head at FIG. 7;

FIG. 27 is a front elevation of the testing head at station 7;

FIG. 28 is a schematic illustration of a vacuum system for use with the apparatus illustrated in FIG. 6; and FIG. 29 is a timing diagram for the apparatus of FIG. 6.

DESCRIPTION OF A PREFERRED EMBODIMENT

The apparatus described below is specifically designed to assemble the variable geometry adjustment mechanism into an adjustable-type razor blade magazine (of the type described in U.S. Pat. No. 3,375,578 issued on Apr. 2, 1968) after the entire assembly of the razor blade magazine except for the variable geometry adjustment mechanism has already occurred. The description of the magazine in general as well as the variable geometry adjustment mechanism will precede the description of the assembly apparatus since various details of the latter are dependent upon the configuration of the magazine and adjustment mechanism.

As shown in FIG. 1 the magazine 10 is mounted within an open-topped rectangular container or tray 12. The container 12 has an aperture 14 at the center of one end. Studs (not shown) integral with the floor of the container precisely define the depth of the magazine 10 within the container 12 and ribs 18 limit the forwardmost position which magazine 10 can attain in the container 12.

The magazine 10 includes a back member 20 and a front member 22. On the back member 20 of the magazine is formed a recess 24 in which is disposed a guide plate 26. This guide plate has a main body portion in which is disposed an aperture 28, a depending foot 30 having parallel sidewalls 32, and two upstanding arms 34 each of which has an aperture 36 in its upper end in which is received a pin 38 (see also FIG. 2).

The variable geometry mechanism of the razor blade magazine 10 is illustrated in greater detail in FIG. 2. Blade 40, supported on blade support platform 42, is a thin strip of stainless steel having a sharpened forward edge 44 and an unsharpened rear edge 46. Disposed above the blade support platform 42 and extending forwardly over that platform are a series of four spaced tabs 48 (see also FIG. 1) which act as guides contributing to the definition of the path of the blade 40 through the shaving zone defined by the blade support platform 42. Below the blade support platform is formed a guard structure 60 that includes a guard surface 62 at its forward end. This guard structure is secured to the blade support platform by a web hinge element 64 which is secured to the blade support platform at the front edge 66 of that platform. This hinge web 64 in the illustrated embodiment is an imperforate web 0.005 inch in depth which is reinforced by 16 rib elements 68, each of which has a depth of 0.015 inch and a width of 0.030 inch, and which are spaced 0.060 inch apart.

As best shown in FIG. 2, the undersurface 76 of blade support platform 42 and the upper surface 78 of adjusting lever element 72 cooperate to form a tapered recess 80 with hinge web 64 at its narrow end.

Slots 70 are provided in the guard member between guard surface 62 and front edge 66 to permit movement of hair particles or other debris that might accumulate during the shaving operation away from the shaving zone. Extending rearwardly from hinge web 64 and integral therewith is an adjusting element 72 in the form of a flat elongated member that has a pair of pins 38 projecting from its rear or upper surface. The blade support platform 42, hinge web 64, and adjusting element 72 are manufactured of a moldable organic plastic capable of being subjected to repeated deformation stresses. A suitable plastic material is an acetyl plastic sold under the name Celcon.

The variable geometry mechanism is actuated by rotation of an adjustment lever 74 within aperture 28 of guide plate 26, thus causing the guide plate 26 to slide within recess 24 formed on the back member 20. This motion is transmitted to adjusting element 72 and thereby to guard structure 60. The movement of adjusting element 72 also causes flexure of the resilient hinge web 64.

FIGS. 3, 4, and 5 illustrate details of the guide plate 26 and adjustment lever 74. The guide plate 26 has a main body portion in which is disposed an aperture 28; a depending foot 30 having parallel sidewalls 32; and two upstanding arms 34, each of which has an aperture 36 in its upper end in which is received a projecting pin 38 of the variable shaving geometry mechanism as described above and as more fully described in the previously mentioned U.S. Pat. No. 3,375,578.

The aperture 28 in guide plate 26 includes a right-hand curved section 84 of 0.135 inch radius, a left-hand curved section 85 of 0.101 inch radius, two straight horizontal connecting surfaces 86, and two aligned vertical surfaces 87 that connect the two curved end sections 84, 85. The distance between surfaces 86 is 0.203 inch. The lower edges of surfaces 85 and 86 devise a smooth radius of 0.005 inch as indicated by dotted line 88. Each aperture 36 in arms 34 is in an offset portion and is formed by sequential embossing and punching steps to provide the offset which increases the engagement of apertures 36 with the pins 38 mentioned above.

The adjustment lever 74 has a handle portion 89 on the rear surface of which is formed a ridge 89a adapted to engage a series of grooves in the face of the magazine for locking the adjusting lever 74 in a particular adjusted position. The adjustment lever 74 also includes a first cylindrical portion 90 which is received in an aperture in the cover of the razor blade magazine (not shown). A second cylindrical portion 90a is connected to portion 90 by web 91 which has unsymmetrical flexibility. Portion 90 is molded at an angle of 4° with respect to the axis of portion 90a. Both cylindrical portions 90 and 90a have tapered surfaces 92 at their edges to facilitate entrance into the appropriate apertures of the razor blade magazine 10. Formed to the rear of portion 90a is a cam surface 93.

At the end of the adjustment lever 74 is a latching structure 94 of configuration as indicated in the FIGS. 4 and 5. The latching structure 94 includes a relatively large radiused section 95 at its right end as viewed in FIG. 5 and a smaller radiused section 95a at its left end. These surfaces are connected by a transition surface 96. Surfaces 95a and 96 are inclined at 45° angles. The undersurface of section 95 forms a latching surface.

In assembly, the adjustment lever 74 is inserted from the front of the magazine 10 through the appropriate apertures therein. Guide plate 26 is then positioned in the recess 24 on the back 20 with the pins 38 disposed in the apertures 36 in the upstanding arms 34. Guide plate 26 is restrained for rotation about an axis defined by the pins 38 as it engages the fixed inclined camming surfaces 95a and 96 of latch portion 94 and is forced by those surfaces upward as viewed in FIG. 1. The guide plate 26 snaps into the recess 24 where it is restrained by the vertical sidewalls that engage edges 81 and by latching undersurface of section 95 of the adjustment lever 74. The adjustment lever 74 is flexed as permitted by the coupling section 91 in this assembly operation so that the axes of sections 90 and 90a are substantially aligned. The adjustment lever thus secures the components of the cartridge together; guide plate 26 being restrained by engagement of depending foot 30 with the vertical sidewalls of recess 24, by engagement of pins 38 with apertures 36, and by the engagement with the latching structure 94 of lever 74.

The apparatus described below serves to assemble the adjustment lever 74 and guide plate 26 into the magazine 10 (preassembled but for lever 74 and guide plate 26) and to perform tests upon the fully assembled variable geometry razor blade magazine.

The overall machine configuration, as shown in FIG. 6, includes a turret 100 with eight identical nest elements 101 mounted on its upper surface and spaced symmetrically about its periphery. A base 102, which remains stationary with respect to the turret 100, supports four pivoted arms 104. Stops in the turret rotation (described below) define the locations of eight separate operative stations. Pivoted arms 104 are associated with each of operative stations 1, 3, 5, and 8. Each arm 104 has an operative head (not shown in FIG. 6) which functions, as described in detail below, to perform a step in the assembly.

The operation of each of the operative heads is facilitated by the employment of a vacuum. Thus vacuum lines are provided which radiate from a distribution coupling 106 which is mounted upon a pedestal 108 supported by a stationary vertical shaft (not shown) affixed, through an aperture in the center of turret 100, to base 102. Vacuum lines 110 and 112 provide continuous vacuum to the operative heads associated with stations 1 and 5. Vacuum lines 114 and 116 provide sequenced vacuum (as described in connection with FIG. 28) to the operative heads associated with stations 3 and 8. Feeder mechanisms 118, 120 and 122 supply adjustment levers 74, razor blade magazines 10 assembled but for levers 74 and guide plates 26, and guide plates 26, respectively. The ultimate location at which each of these three items is delivered by its feeder mechanism is positioned to be aligned with the associated operative head when the associated pivoted arm 104 is at its extreme position in its swing away from the turret 100.

Details of nest construction may now be described with reference to FIGS. 7 and 8. The nest assembly 101 is mounted upon a baseplate 128 which is bolted to the turret 100 by bolts 103. Pedestal 130 is rigidly affixed to baseplate 128 and is relieved, channelled, and hollowed so as to accommodate the constituent elements of the nest assembly, as shown in the drawings and described in detail below.

The nest assembly 101 includes a pilot pin receptacle 132 which comprises an upstanding receptacle rigidly affixed to baseplate 128 to the rear of and adjacent pedestal 130. Pilot pin receptacle 132 has an upwardly open, cylindrical cavity 134 into which a pilot pin, affixed to various operative heads, may be inserted to properly align an operative head over the nest assembly. An adjustable pilot pin stop 136 is provided which protrudes from the lower surface of cylindrical cavity 134. Set screw 138 maintains stop 136 at a predetermined height.

The nest assembly 101 also includes an adjustment lever clamp 140. The adjustment lever 74 is clamped by the handle portion 89 with the axis of portion 90a (see FIG. 4) vertical. To this end the clamp 140 comprises a fixed jaw 142 and a movable jaw 144; the latter being rigidly attached to, and preferably integral with, a slide 146. Slide 146 is loaded by spring 148. The rest separation of jaws 142, 144 is less than the thickness of the handle portion 89, of the adjustment lever 74. Plunger 150 serves to open jaws 142, 144 against the pressure of spring 148, when depressed by the action of clamp released cam unit 152.

Clamp release cam unit 152 comprises rocker arm 154, cam roll 156, and loading spring 158. Rocker arm 154 has a bevelled camming surface in the region where it contacts the rounded head portion 160 of plunger 150.

Pedestal 130 has communicating channels 164, 166 and 168 in its front, back, and bottom faces, respectively. Magazine support member 170 is located within channels 164, 166, and 168 in a vertically slidable relation to pedestal 130. Magazine support member 170 has front, back, and bottom portions 172, 174, and 176 respectively which are preferably integral, and which are sized for ease of vertical slidability within the channels without permitting rotation or wobble. Back portion 174 of magazine support member 170 has a stud 178 which projects above the upper surface 179 of the back portion 174. The upper surface of stud 178 supports the magazine 10 through an aperture in the bottom of tray 12 (not shown).

A magazine latch arm 127 and a magazine positioner arm 129 are pivotally mounted upon the magazine support member 170 at opposite ends thereof. The latch arm 127 and the positioner arm 129 are spring loaded by springs 131 and 133 respectively at their lower ends so as to bias the upper ends inwardly over the magazine support member 170. The upper end of positioner arm 129 is forked to provide two vertically upstanding fingers 135 and 137. Each finger 135 and 137 has a carbide insert 139 (shaded in FIG. 7) at the point where a razor blade magazine tray contacts the fingers 135 and 137 when a magazine 10 is loaded into the nest assembly.

The latch arm 127 has a notch 141 in its upper end so as to provide a bearing surface which exerts a downward pressure upon the bottom end 16 of the magazine 10 (see FIG. 1). Surface 17 of the magazine 10 is positioned against surface 127a of latch arm 127 for locational purposes.

Conventional adjustable stops 143 and 145 are provided to adjust the rest positions of the latch arm 127 and the positioner arm 129, respectively.

A cam roll 147 is mounted on a supporting member 149. The supporting member 149 is affixed to the pilot pin receptacle 132 by means of bolts 151. The holes in support member 149 through which the bolts 151 extend (not shown) are elongated in the vertical direction to permit adjustment of the vertical position of cam roll 147. The cam roll 147 is used to actuate the operative head at station 5 for assembly of a guide plate 26 with a magazine 10 and an adjustment lever 74. As will be described below, the proper vertical adjustment of cam roll 147 is critical to a properly timed actuation.

Reference is now made to FIGS. 9, 10, 11 which illustrate the details of construction of the apparatus at station 1. Except for the operative head itself and for other minor differences which will be noted, the following description is applicable to stations 3, 5, and 8 as well as to station 1.

The operative head 180 is supported by an arm 182 which is in turn cantilevered from a vertical shaft 184. The shaft 184 is rotatably and slidably mounted in a vertical orientation within a supporting collar 186. The collar 186 is attached to the machine base 102 below the level of the turret 100.

A lever arm 188 is rigidly affixed to the shaft 184 and extends through an aperture in the collar 186. A push rod 190 extends between the end of lever arm 188 which is remote from shaft 184 and pivoted cam follower arm 192. The opposite end of cam follower arm 192 supports a cam roll 194 which rides the edge of cam 196, under the influence of loading spring 198, to provide a reciprocating rotational motion of shaft 184 of approximately 60° excursion. The extreme points of this reciprocating rotational motion are such that at one extreme the operative head 180 is aligned over the nest 101 which is then at station 1 and at the other extreme it is aligned with the delivery location on the adjustment lever delivery tract 200 at which the next adjustment lever 74 is provided.

A cam follower arm 202, pivoted at 204 within pivot support number 206, is splined at one end to a relieved portion 208 of shaft 184 between flanges 210 and 212 by means of fingers 214 and 216 which extend between flanges 210 and 212 to permit rotation of shaft 184 without interferring with the operation of pivoted arm 202.

The other end of pivoted arm 202 supports a cam roll 218 which rides the undersurface of cam 220. A tension spring 222 is disposed between an extension 224 of pivoted arm 202 and a machine base 102 biasing the shaft 184 and the operating head 180 downward. Thus the vertical motion of shaft 184 and operative head 180 is positive (that is under the influence of cam 220) in the upward direction. The choice of positive upward action is dictated for safety reasons; in that, should the operative head 180 fail to disengage from the nest assembly 101 before the renewed rotation of the turret 100, machine damage would almost certainly occur. As an additional safety feature there is provided a microswitch 226 so mounted with respect to lever arm 188 that excessive rotation of shaft 184 (such as would occur should the turret 100 renew rotation before operative head 180 had become disengaged from the nest assembly 101) the microswitch 226 would be closed. The closing of the microswitch 226 may be utilized, by means of conventional circuitry, to stop the machine.

A nest clamp actuator assembly is also provided which comprises a pivoted cam follower arm 228 which has a cam roll 230 on its lower end. The cam roll 230 rides the edge of cam 232 under the influence of loading spring 234 which is disposed between the pivoted arm 228 and the collar 186. The upper end of pivoted arm 228 supports an actuator bar 236 which is aligned with the cam roll 156 of the nest assembly.

An antibacklash device, indicated generally by the number 221, is provided (see FIGS. 10 and 11) at operative stations 1, 3, and 5. The device 221 comprises an arm 223 which is keyed to an extension 225 of shaft 184 which protrudes below the base 102. Arm 223 has a cam roll 227 mounted on it. The angular orientation of the arm 223 with respect to shaft 184 is such that at the extreme angular position of shaft 184 remote from the nest element 101 the roll 227 will strike the face of disk 229 integral with plunger 231 and will compress spring 233 thereby absorbing backlash energy.

The operative head 180 at station 1 (see FIG. 11) comprises a base member 238 having two vertical channels 240 and 242 therein. Pilot pin 244 is suspended within, and extends below, channel 240.

A hollow shaft 248 is supported within and extends below channel 242. Shaft 248 has a flange 250 at its upper end and communicates with a source of vacuum by mean of a plastic tube 252. The shaft 248 is spring loaded by spring 254 so as to permit approximately one-sixteenth inch overtravel should the gross vertical motion of the entire operating head 180 (as well as vertical shaft 184 and cantilevered arm 182) be somewhat improperly adjusted. The opening at the lower end of shaft 248 is sized to prevent an entire adjustment lever from being sucked into the shaft under the influence of the vacuum supplied by plastic tube 252. Within the opening at the lower end of shaft 248 there are located a pair of fingers (not shown) which are suitably sized and positioned to engage the notches 256 in the end of the adjustment lever 74 (as best seen in FIG. 5).

As shown in FIG. 1, an adjustment lever detector 124 is placed between stations 1 and 2. This device serves as a check to insure that an adjustment lever 74 has properly been placed in the nest at station 1 in order to eliminate malfunction of the machine should an adjustment lever be improperly placed in the nest or should an adjustment lever fail to be placed in the nest. As shown in FIG. 12 the detector 124 consists essentially of a microswitch 256 and a forked pivoted arm 258. The upper branch 260 of the forked arm 258 is aligned with the trip arm 262 of microswitch 256. The lower branch 264 of the forked arm 258 is so aligned that an adjustment lever 74 properly clamped in a nest assembly 101 will strike the lower surface of branch 264. The lower branch 264 is made of non-binding material (e.g., Teflon).

Reference is now made to FIGS. 13 and 14 which illustrate portions of station 3, the magazine supply station. Except for the details of the operative head and the magazine feeder mechanism and for the substitution of an unlatching assembly for the unclamping assembly, station 3 is virtually identical to station 1.

The unlatching assembly is similar to the unclamping assembly described above. It is, however, positioned so that it will be aligned with the lower end of the pivoted latch arm 127 of the nest assembly 101 rather than with the cam roll 156. In addition, the bearing surface is preferably rounded to bear upon the planar surface of the pivoted latch arm.

As shown in FIG. 13, the operative head at station 7 includes a pilot pin 244 arrangement identical to that of station 1. The portion of the operative head which locates and transports the magazine 10 from the magazine feeder and positioner mechanisms to the nest includes vacuum cups 268 and reference surfaces 270 and 272. The tips of the vacuum cups 268 are made of a resilient material and the cups are so positioned that when the razor blade magazine and tray are placed in relation to reference surfaces 270 and 272 in the manner to be described the vacuum cups seal off on the tray 12 which contains the magazine 10. The vacuum cups are in communication with plastic tubing 274 which in turn is connected to a source of a sequenced vacuum.

A conventional gravity-feed slice-feeder mechanism (not shown) introduces razor blade magazines 10 (disposed within trays 12) one at a time to the positioning device illustrated in FIG. 14. The positioning device is so located that the magazine 10 and tray 12 are in vertical alignment with the operative head at the extreme position of its angular excursion. The positioning device includes a shaft 276 which is rotatably mounted within a fixed frame member 278. Shaft 276 has a flange 280 integral therewith. Flange 280 has two studs 282 and 284 which are pivotally mounted in the flange and extend above its upper surface. Rods 286 and 288 extend between and are rotatably connected to studs 282 and 284 and to bolts 290 and 292. Bolts 290 and 292 secure slides 294 and 296 to blocks 298 and 300 respectively. Slides 294 and 296 slide within channels 302 and 304 in a supporting member 306. Blocks 298 and 300 have extensions 308 and 310 whose surfaces 312 and 314 support the razor blade magazine and tray to be positioned. Positioning elements 316 and 318 with contact surfaces 320 and 322 are adjustably mounted upon blocks 298 and 300 respectively by means of bolts 324 and stops 326.

Station 5 may be described with reference to FIGS. 15 through 20. Other than the features to be described below shown in these figures, the only difference is between the structure at station 5 and that at stations 1 and 3 are the absence of both a nest clamp actuator assembly and a nest latch actuator assembly and the provision of an elongated and upturned extension 224 of pivoted arm 222 (see FIG. 10) so that a more powerful tension spring may be disposed between the extension and the machine base 102 to provide the increased force required for assembly of the guide plate 26.

As shown in FIG. 15, the operative head at station 5 includes a pilot pin 244 as do stations 1 and 3. The remainder of the operative head comprises a pivoted guide plate assembly head indicated generally by the numeral 328. The pivoted head 328 is affixed to a vertically upstanding shaft 330 which is in turn rotatably supported within bearing units 332, 334, and 336. The pivoted head 328 is biased in a counterclockwise sense, as viewed from above, by means of a compression spring 338 disposed between rearward extending leg 340 of pivoted head 328 and a downward extending projection (not shown) of the arm 182 of station 5.

The pivoted head 328 has a stud 342 projecting from its front surface. An actuator arm 344 is pivotally mounted upon stud 342. The actuator arm 344 (best seen in FIG. 17) has a recess 346 in one side thereof to receive a biasing spring 347. A foot portion 348 of actuator arm 344 has a bevelled surface 350 and a carbide bearing portion 352.

A locking member 354 is slidably mounted in a vertical orientation in pivoted head 328 and is biased downward by compression spring 356. As best seen in FIG. 18, the locking member 354 has an upstanding shaft portion 358 having a recess 360 to receive the compression spring 356. A foot portion 362 has two projections 364 and 366, each of which has a carbide bearing surface (368 and 370, respectively) affixed thereto. The disposition of the locking member 354 with respect to the actuator arm 344 is best seen in FIG. 16, the carbide bearing portions 352 and 370 being in contact.

The lower surface of pivoted head 328 is illustrated in FIGS. 19 and 20. A rubber element 372 (shaded in FIGS. 19 and 20) is affixed to the lower surface of the main body of pivoted head 328 in a recess provided for this purpose. The rubber element 372 itself has a U-shaped recess 374 which is in communication with ports 376 which are in turn connected to a source of vacuum.

Lands 378 and 380 are provided such that their surfaces are about 0.004 inch below the surface of the rubber element 372. Pins 382 and 384 project about 0.010 inch beyond surface of the rubber element 372. The pin 384 has its end surface tapered at an angle of approximately 15°. The projection of pins 382 and 384 beyond the surface of rubber element 372 is adjustable in a conventional fashion by means of setscrews 386 and 388. A generally circular recess 391 is provided which is of greater depth than the recess in which the rubber element 372 is disposed.

A locator pin 390 is provided which has a notch 392 (see FIG. 15) in its lower end. Pins 394 and 396 project beyond the surface of rubber element 72 and have an annular wall and a recessed center portion which is suitably sized to receive a projecting pin 38 of the variable shaving geometry mechanism of a razor blade magazine 10.

Stations 6 and 7 perform inspections to detect defective razor blade magazines. Since the inspection operations can be carried out by means of merely reciprocal vertical motion, the apparatus which has been described in detail in relation to station 1 can be eliminated at these two stations.

The mechanism which supports and moves the testing heads 367 and 369 at stations 6 and 7 is shown in FIGS. 21 and 22 and comprises a pair of testing head mounting blocks 371 and 373, each integral with a connecting member 375. Each mounting block is slidably mounted on a separate rigid vertically arranged shaft 377, which is stationary with respect to turret 100, and is biased downwardly by a spring 379. A lever arm 381 is pivoted at 389 upon a supporting member 383 above the center of the turret 100. The shafts 377 extend between portions 383a and 383b of supporting member 383. The arm 381 extends above the connecting member 375 radially outward to a point beyond the periphery of the turret 100. A pivoted connecting arm 385 connects the pivoted lever arm 381 and the connecting member 375. The free end of the lever arm 381 is pivotally connected to a push rod 387 which is actuated by a cam and cam follower arrangement (not shown) to describe a reciprocal vertical motion.

The testing head at station 6 is illustrated in FIGS. 23, 24, and 25. The testing head includes a backplate 396 on the back side of which is formed a tongue 398. The tongue 398 mates with a groove cut into the base of the mounting block for station 6. Elongated holes 400 and 402 in back plate 396 permit the adjustable bolting of the testing head to the mounting block. The body 404 of the testing head is cantilevered from the backplate 396 by means of connecting arm 406.

Four probe members 408, 410, 412, and 414 are supported within four vertical channels in the testing head body 404. Each of the probe members has a flange 416 in the center region thereof and is relieved above the flange to allow the placement of a loading spring 418 within the channel in the body 404 above the flange 416. Each probe member extends both above and below the body 404. The portion extending above the body 404 comprises a stud 420 upon which are threaded two nuts 422 and 424 between which an electrical connector may be compressed.

A bolt 426 which is screwed into the bottom of the backplate 396 serves as an adjustable stop which strikes a predetermined reference surface on the nest assembly (e.g., the top of pilot pin receptacle 132). Since the downward motion of the testing head is accomplished by means of the springs 379 rather than the cam assembly itself, the stop 426 may be used to precisely vertically position the lower surfaces of the probes 408, 410, 412, and 414 with respect to the critical portions of the razor blade cartridge.

As discussed above in conjunction with FIG. 2, the variable geometry mechanism of magazine 10 includes a hinge web 64 reinforced with 16 rib elements 68 which are equally spaced along its length. It has been found that a single broken rib element 68 near the end of hinge web 64, or a plurality of broken rib elements 68 near the center thereof, will sufficiently affect the variable shaving geometry mechanism so that the razor blade magazine must be deemed defective. A testing head is provided at station 7 to test the structural soundness of the hinge web 64, and the rib elements 68, so that defective magazines may be identified.

A probe support member 428 is attached to the main body 430 of the testing head by means of bolts 432. Three probes 434, 436, and 438 are mounted, in slidable relation to probe support member 428, in vertical channels therein, and are supported by flanges 440, 442, and 444. Above each probe is an arm 446 pivotally mounted on the body 430 and biased downwardly by spring 448 so that projection 450 rests upon the corresponding probe flange. Bolts 452 in the forward ends of arms 446 secure leads 454 and electrically conducting strips 456 (which have electrical contacts 458 mounted on their upper surfaces) to arms 466.

Above and aligned with contacts 458 are tips 460 of studs 462 which are supported on head body 430. Electrical leads 464 are secured in electrical contact with studs 462. The precise positions of studs 462, and thus the distance which contacts 458 must travel to make contact, are maintained by set screws 466. For this particular hinge web and these probes, this distance is set at nine thirty-seconds inch.

The tips 468, 470, and 472 of probes 434, 436, and 438 are of generally rectangular cross section. Tips 464 and 472 each have a stressing dimension (the width in FIG. 26) of 0.0443 inch, while tip 470 has a stressing dimension (the width in FIG. 26) of 0.0473 inch.

A stop block 474 having a lip 476 is mounted on the lower surface of probe support member 428.

Except for the operative head itself, the apparatus at station 8 is very similar to that at station 1. The only substantial difference between station 8 and station 1 is in the pivoted arm 202 and the pivot support member 206. At station 8 these two elements are constructed in a mirror image of those elements as shown in FIG. 10. The purpose of this change is merely for convenience of machine assembly and operation, in that it permits angular movement of the operative head of station 8 in a sense opposite that of stations 1, 3, and 5. This is desirable merely because the location of the feeder mechanism at station 1 would require at best a cramped location for station 8 if operating head were to swing in the same direction as the other operative stations.

A further difference from station 1 is that while station 8 has a single pivoted cam follower arm 228 (see FIG. 11), it has both the unclamping actuator bar 236 of station 1 and unlatching actuator bar of station 3 (not shown).

The operative head at station 8 (not shown) has no pilot pin since the precise location upon the cartridge at which the vacuum supply to the operative head is sealed off is of no consequence and thus the precise location of the operative head with respect to the nest assembly is unimportant. Thus the operative head of the station 8 basically comprises a plastic tube through which a source of vacuum is supplied. The tube communicates with a pair of vacuum cups. The position of the tips of the vacuum cups is adjusted so that they will seal off on the tray 12 of the razor blade magazine 10 as the operative head is lowered through the approximately 1.5 inch excursion described in relation to station 1.

The vacuum requirements of the various operative stations are supplied by a single system as illustrated schematically in FIG. 28. The main vacuum coupling 106 as well as the required switches and valves are mounted upon platform 108 (see FIG. 6) above the turret 100. Platform 108 is rigidly affixed to a stationary shaft (not shown) protruding through an aperture in the center of the turret 100. Such a location for the vacuum apparatus provides for simple radial distribution to each of the operative heads requiring a source of vacuum.

As shown in FIG. 28 the vacuum coupling 106 is connected directly to operative head at station 1 by means of tube 482 to provide a continuous vacuum supply. Similarly, a continuous source of vacuum is present in operative station 5 through tube 484 which connects operative head 5 with the vacuum coupling 106. Stations 3 and 8, however, have solenoid valves 484 and 488 respectively placed in series in tubes 490 and 492 between the operative heads and the vacuum coupling 106. These valves are controlled with cam switches and conventional circuitry so that vacuum is supplied to heads 3 and 8 during the appropriate portions of the cycles at stations 3 and 8, as described below.

The vacuum circuits to operative heads 3, 5, and 8 also include vacuum switches 494, 496, and 498 respectively. These switches are in communication with the vacuum tubes 490, 484, and 492 connecting the respective operative head and the vacuum coupling 106. By means of conventional circuitry, switches 494, 496, and 498 may be employed to energize an emergency stop should the air pressure in tubes 490, 484, or 492 indicate malfunctions at operative stations 3, 5, or 8 as described below.

The general sequence of operation of the machine illustrated is as follows: variable shaving geometry levers 74 are supplied to the nest 101 at station 1. Between stations 1 and 2 lever detector 124 senses whether or not a lever has been successfully deposited in the nest 101. In the embodiment illustrated station 2 is unused. At station 3 a razor blade magazine 10 is fitted over the upstanding lever 74 already in the nest 101. In the embodiment shown station 4 is also unused. At station 5 a variable shaving geometry guide plate 26 is supplied and is engaged with the lever 74 already in the nest 101 to complete the assembly of the razor blade magazine 10 having a variable shaving geometry capacity. Stations 6 and 7 perform tests as described above. At station 8 the assembled magazine is removed from the nest and deposited in a chute which leads to a finished product bin (not shown).

A more detailed description of the operation is given below in conjunction with the timing diagram of FIG. 29.

The timing, sequence, and operation of all the mechanisms in the automatic apparatus in controlled by a series of cams (many not shown in any FIG.). The timing and sequence in degrees of cam rotation is indicated in FIG. 29 which graphically shows the operation of the cams at various stations. Each of curves 11—24 indicates a 360° cycle of a separate cam, the letters A—Z indicating the function controlled by the cams, in accordance with the table below, which will be better understood in connection with the following description of the assembly sequence.

| Station No. | Cam No. | Function No. | Description of Function |
| --- | --- | --- | --- |
| turret control | 11 | A | Index turret 100 |
| 1 | 12 | B | Transfer adjustment lever 74 to nest 101 |
| 1 | 12 | C | Return (angle) to feeder 118 |
| 1 | 13 | D | Sweep lever 74 from track of feeder 118 |
| 1 | 13 | E | Deposit lever 74 in nest 101 |
| 1 | 13 | F | Return (raise) after deposit of lever 74 in nest 101 |
| 1 | 14 | G | Unclamp nest jaws 142, 144 |
| 1 | 14 | H | Release nest jaws 142, 144 |
| 3 | 15 | I | (a) Transfer magazine 10 to nest 101 and (b) feed next magazine 10 into positioner (FIG. 14) |
| 3 | 15 | J | Return for next magazine 10 |
| 3 | 16 | K | Pick up magazine 10 from positioner |
| 3 | 16 | L | Deposit magazine 10 in nest 101 |
| 3 | 17 | M | Unlatch nest latch 127 |
| 3 | 17 | N | Release nest latch 127 |
| 3 | 18 | O | Position magazine 10 in positioner |
| 5 | 19 | P | Transfer guide plate 26 to nest 101 |
| 5 | 19 | Q | Return for guide plate 26 pickup |
| 5 | 20 | R | Guide plate 26 pickup |
| 5 | 20 | S | Deposit and assemble guide plate 26 |
| 6 (and 7) | 21 | T | Lowering of testing heads 367, 369 |
| 6 (and 7) | 21 | U | Return of testing heads 367, 369 |
| 8 | 22 | V | Transfer assembled magazine 10 from nest 101 to chute 126 |
| 8 | 23 | W | Pick up magazine 10 |
| 8 | 23 | X | Unload magazine 10 onto chute 126 |
| 8 | 24 | Y | Unlatch nest latch 127 and unclamp nest jaws 142, 144 |
| 8 | 24 | Z | Release nest latch 127 and nest jaws 142, 144 |

The operation of the apparatus in assembling the variable geometry mechanism into a razor blade magazine 10 will be best understood by the following a single-nest assembly 101 as it moves through the series of the operative stations, it being understood that the operations are simultaneously being performed at several stations.

In the automatic apparatus, turret 100 indexes a nest assembly 101 to station 1 (the other seven nest assemblies 101 on the turret 100 simultaneously being indexed at stations 2—8 inclusive). The turret indexing (cam 11) occurs during the first 90° of cam rotation and immediately thereafter the turret 100 is locked in position until just before the cams complete their 360° cycle.

While the nest assembly 101 is being indexed to station 1, the operative head 180 at station 1 is sweeping (cam 13 function D) an adjustment lever 74 from the end of track 200 (see FIG. 9) which is the ultimate delivery point for aligned adjustment levers from the vibratory feeder mechanism 118 (FIG. 6).

The adjustment lever 74 is retained in the operative head 180 of station 1 during the transfer (cam 12 function B) of the lever from the tract 200 to the nest assembly 101 by means of the continuous vacuum supplied through tube 252. Immediately after the turret 100 has stopped its movement and before the operative head is positioned over the nest assembly 101, the jaws 142, 144 of the nest assembly 101 are opened preparatory to receiving the adjustment lever 74. The unclamping of the jaws 142, 144 (cam 14 function G, corresponding to cam 232 of FIG. 11) occurs when force is applied by actuator bar 236 to the cam roll 156 affixed to rocker arm 154 of the nest assembly 101. The rocker arm 154 rotates against the force of the loading spring 158 thus applying a pressure against plunger 150 at its rounded head portion 160, since rocker arm 154 has an inclined cam surface adjacent the head portion 160. The lateral motion of the plunger 150 forces the moveable jaw 144 to be moved away from the fixed jaw 142 against the pressure of loading spring 148 (see FIG. 7).

At this point the vertical motion of the operative head 180 deposits the lever into the opened jaws (cam 13, function E). The reclamping of the jaws 142, 144 (cam 14, function H) is sufficient to break the vacuum which has been retaining the lever 74 in the operative head 180 when the return or upward vertical motion (cam 13, function F) occurs. After the vertical return the operative head 180 begins its angular return (cam 12, function C) to sweep the next adjustment lever 74 from tract 200.

During the nest indexing of the turret 100 the properly deposited adjustment lever 74 will strike the lower branch 264 of the forked arm 258 of the lever detector (see FIG. 12) thereby closing microswitch 256. The lower surface 266 of branch 264 extends for a length of 0.75 inch along the path which a properly aligned adjustment lever 74 will follow as the turret 100 indexes. Such a length is required to insure contact in the microswitch when the adjustment lever is traveling with the speed of the turret when the machine is operating at a rate of 60 45° rotations a second. The failure to close microswitch 256 on any rotation of the turret 100 indicates a missing or misaligned adjustment lever 74. This failure can be employed by means of conventional circuitry, to stop the machine so as to prevent machine damage as subsequent operative stations attempt to function in the absence of a properly deposited adjustment lever 74. The circuitry (not shown) includes a cam switch, normally open which closes at the portion of the cam cycle during which microswitch 256 would be closed by a lever 74. If switch 256 is not closed the cam switch energized a coil relay which illuminates a "missing lever" light on the control panel and also closes a contact which stops the machine at the completion of the turret indexing then in progress.

After a pause at station 2 which is unused in the preferred embodiment, the nest assembly 101 and the adjustment lever 74 clamped therein are indexed to operative station 3.

Meanwhile, the operative head at station 3 is picking up (cam 16, function K) a razor blade magazine 10 from the positioning device (FIG. 14). The orientations of the positioning device and the operative head are such that the reference surface 270 bears against surface 17 of the magazine 10 (See FIG. 1). The reference surface 272 comprises two downward extending fingers which engage surfaces 48a of projections 48 (see FIG. 1). The operative head then transfers the magazine 10 and tray 12 from the positioner to a point vertically above the nest assembly 101 (cam 15, function I).

At the same time the nest latch 127 is rotated in a counterclockwise sense as shown in FIG. 8 by means of the unlatching assembly at station 3 (cam 17, function M) so that the nest can receive the magazine 10 and tray 12. The operative head then deposits the magazine 10 into the nest 101 (cam 16, function L) such that the adjustment lever 74 is inserted into the aperture in the magazine 10 which is designed to receive it. In this configuration the pressure against the lower part of latch arm 127 is relieved (cam 17, function N) and the compression spring 131 rotates the arm 127 such that the notch 141 engages the bottom end 16 of the magazine 10. The pressure of surface 127a of latch arm 127 against surface 17 of the magazine 10 maintains the magazine snugly against the projections 18 of the tray 12. The tray 12 is retained at the opposite end by means of the upstanding fingers 137 and 135 of the positioner 139 (see FIGS. 7 and 8) to locate the side-to-side position of the tray (as seen in FIG. 7). The stop 143 on the latch arm 127 defines the front-to-back position of the tray 12 (also as seen in FIG. 7).

With the magazine 10 and tray 12 latched to the nest assembly 101 the vacuum supply to the operative head is withdrawn and the operative head is raised (cam 16, function L') away from the nest assembly 101. The operative head then returns (cam 15, function J) to pick up the next magazine 10 and tray 12 from the positioning device.

The same cam (cam 15, function I) which is employed in the transfer of the magazine 10 and tray 12 from the positioner to the nest assembly 101 is used to slice feed the next magazine 10 and tray 12 from the conventional gravity feed device (not shown) to the positioner (FIG. 14). This slice feed occurs with the positioning elements 316, 318 (FIG. 14) spread apart at their extreme positions. With the magazine 10 and tray 12 in the positioner, the shaft 276 is rotated (cam 18, function O) and the resulting inward radial force on connecting rods 286 and 288 causes the inward movement of blocks 298 and 300 and of the positioning elements 316 and 318 which are mounted thereon. The contact surfaces 320 and 322 are arranged to contact the bottom end 16 of the magazine 10 and the opposite end of tray 12, respectively. The pressure applied at these points serves to locate the magazine 10 within the tray 12 and the position of the tray 12 itself, in a manner analogous to the operation of the latch arm 127 and the positioner 129 of the nest assembly 101 (as described immediately above).

A vacuum switch (494 of FIG. 8) associated with station 3 is connected in a conventional fashion to monitor the operative head at station 3 and energize a machine brake (not shown) if the operative head either should fail to pick up a magazine from the positioner mechanism or fail to successfully deposit the magazine into the nest assembly 101. Two cam switches (not shown), each normally open, are provided with one in series with each pole of the two-setting vacuum switch 494. The closing of these switches during predetermined portions of the cam rotation can be employed to check that the switch 494 is then in the position indicating either a successfully picked-up magazine or a successfully deposited magazine.

At station 5 a guide plate 26 is picked up from the ultimate delivery location of the vibratory feeder mechanism 123 as the vertical motion (cam 20, function R) of the operative head causes pins 394 (FIG. 19) to engage the apertures 36 in each of the upstanding arms 34 of the guide plate 26 and causes the pins 384 and 382 to engage the notches 33 (see FIG. 3) of the guide plate 26, and the channel 374 in the rubber element 372 to which vacuum is applied by ports 376 is sealed off on the body of the guide plate 26. The operative head, along with the guide plate 26, is then transferred (cam 19, function P) to a position vertically aligned with the magazine 10 held in the nest assembly 101. The vertical motion of the operative head at this point (cam 20, function S) causes the guide plate 26 to be interlocked with the adjustment lever 74 to complete the assembly of the variable geometry adjustment feature into the razor blade magazine 10 as described below in conjunction with FIGS. 7 and 15—20.

As the pivoted head 328 is lowered the notch 392 in locator pin 390 straddles the adjusting element 72 (see FIG. 1) to force element 72 into the proper alignment so that pins 38 affixed to element 72 will be properly aligned to be received in the central recesses of pins 394 (FIG. 19) on head 328. The annular walls of pins 394 bear down upon the upstanding arms 34 of guide plate 26 in the vicinity of the apertures 36, thereby insuring engagement of apertures 36 with pins 38.

In this configuration the cam roll 147 on nest assembly 101 makes contact with the bevelled surface 350 of the actuator arm 344 (FIGS. 16 and 17). The continued downward movement of the pivoted head 328 causes a deflection to the left, as viewed in FIG. 16, of the actuator arm 344. The contact of bearing surface 352 on actuator arm 344 with the bearing surface 370 on the locking member 354 produces a like leftward deflection of the entire pivoted head 328 within the bearing units 332, 334, and 336.

Due to the configurations of the actuator arm 344 and the locking member 354 as shown in FIG. 16, a portion of the 8° deflection of the pivoted head 328 takes place before the cam roll 147 strikes the carbide bearing surface 368 of the locking member 354. The action of cam roll 147 upon the bearing surface 368 causes the upward deflection of the locking member 354 against the pressure of the biasing spring 356. When, in the upward movement of the locking member 354, the bearing surface 370 is raised above the bearing surface 352 of the actuator arm 344, the actuator arm is free to pivot about bolt 342 with respect to the pivoted head 328 under the influence of spring 347. This removal of the actuator arm 344 and its bevelled surface 350 from the vicinity of the cam roll 147, which permits the pivoted head 328 to return to its initial position under the influence of spring 338 (see FIG. 15), occurs after a total deflection of 8°.

The effect of this precisely timed 8° deflection and return, after engagement of pins 38 with the recesses in the pins 394 on the pivoted head 328, upon the guide plate 26 and the portion of the adjustment lever 74 which is protruding above the magazine 10 may now be described with reference to FIGS. 3, 4, 5, 19, and 20.

In the fully assembled razor blade magazine 10, including the variable shaving geometry adjustment mechanism, the pins 38 on element 72 are engaged with the apertures 36 in the upstanding arms 34 of the guide plate 26 (see FIG. 1), the guide plate 26 is disposed within the recesses 24 on the back member 20 of the razor blade magazine 10, and the adjustment lever 74 and guide plate 26 are interlocked such that the vertical surfaces 87 (see FIG. 3) are disposed beneath and are restrained by the transition surfaces 96 of the latching structure 94 on the adjustment lever 74 (see FIG. 5). If the guide plate 26 were lowered over the adjustment lever 74 without any deflection at all, the interlocking of these members could not be achieved since the vertical surfaces 87 of the guide plate 26 would overlap the transition surfaces 96 on the adjustment lever 74. The 8° rotation of the guide plate 26 with respect to the adjustment lever 74 after engagement of apertures 36 with pins 38 and immediately before the vertical surfaces 87 would strike the transition surfaces 96 causes the large radiused section 95 and the transition surfaces 96 of the latching structure 94 to be aligned with the right-hand curved section 84 of the aperture 28 in the guide plate 26. The small additional lowering of the guide plate 26 places the vertical surfaces 87 at an elevation slightly below the transition surfaces 96 thereby insuring an interlocking of the guide plate 26 and the adjustment lever 74 when the guide plate rotates to its initial orientation as the pivoted head 328 snaps back to its original position upon the locking of the actuator arm 344 by the locking member 354.

Pin 382 on the pivoted head 328 assures that the guide plate 26 will rotate with the pivoted head 328 and pin 384 assures the guide plate will return to the initial orientation when the pivoted head does so.

The lands 378 and 380 bear upon the back member 20 of the magazine 10 as the operative head is lowered and thereby compress spring 151 which biases the entire magazine support member 170. Since the clamping jaws 142, 144 are not similarly spring loaded, the latching structure 94 of the adjustment lever 74 protrudes an abnormal amount above the surface of that member 20 during the 8° rotation and return of the guide plate 26. This permits the insertion of vertical surfaces 87 beneath the transition surfaces 96 as the guide plate 26 is returning from its 8° rotation and before it has snapped into the recess 24 in the back member 20. The withdrawal of the operative head relieves this pressure on the magazine 10 producing a firm engagement of the adjustment lever 74 with the guide plate 26.

As at station 3, at station 5 there is a vacuum switch 496 (FIG. 28) and two cam switches (not shown) which cooperate to energize a machine brake if the operative head either should fail to pick up a guide plate from the feeder mechanism or if it should fail to assemble the guide plate into the magazine assembly so that the next cycle would produce an attempt to pick up a second guide plate from the feeder mechanism on top of the undeposited guide plate.

An arm (not shown) is affixed to the feeder mechanism at station 5 and is so positioned that it will strike the foot portion 348 of actuator arm 344 just before the pivoted arm 182 (see FIG. 9) at station 5 completes its angular swing away from the nest assembly 101. This causes the actuator arm 344 to rotate in a counterclockwise sense as viewed in FIG. 16 against the influence of the spring 347. After a sufficient pivot of actuator arm 344, the locking member 354, under the influence of spring 356, drops to lock the actuator arm in the configuration, as shown in FIG. 16, required for the next assembly of a guide plate.

At stations 6 and 7 the testing heads are lowered (cam 21, function T) as soon as the turret 100 index has been completed and a nest assembly 101 is directly below each testing head. The testing heads are raised up again (cam 21, function U) just prior to the next indexing of the turret 100.

The function of the four probe members of the testing head at station 6 are as follows: probe 408 is a common; probe 410 detects a guide plate 26 which has not dropped into the recess 24 provided therefor in the back member 20 of the razor blade magazine 10; and probes 412 and 414 detect the lack of engagement of the apertures 36 in the arms 34 of the guide plate 26 with the receiving pins 38 formed on element 72 (see FIG. 2) of the magazine 10. To achieve these functions the probes are so placed within the testing head body 404 and the testing head itself is so positioned with respect to the magazine 10 in the nest assembly 101 at station 6, that the common probe 408 will strike the foot 30 of the guide plate 26 even if the guide plate has been somewhat improperly assembled into the magazine 10. The probe 410 positioned adjacent the left edge of the recess 24 which receives the guide plate 26 (see FIG. 1). The probes 412 and 414 are positioned directly above the pins 38.

The testing head functions so that a closed circuit between the common probe 408 and any of the probes 410, 412, and 414 indicates a defectively assembled magazine. A closed circuit between the common probe 408 and the probe 410 indicates that the guide plate 26 has not dropped into the recess 24 after the guide plate assembly at station 5.

The lower ends of the probes 412 and 414 are radiused so as to contact only the plastic pins 38 and not the metal of the guide plate 26. Thus, if the holes 36 of the guide plate are properly engaged with the pins 38 a closed circuit between either of those probes and common 408 may be taken as an indication of an improper engagement of the guide plate 26 with the pins 38.

Since any of the defects which are detected at operative station 6 are remediable it is desired to save the defectively assembled magazine but to prevent it from entering the bin for correctly assembled magazines. To achieve this an air jet (not shown) is disposed along the chute 126 and is activated by a closed circuit indication at operative station 6. A sufficient delay by means of conventional shift registers is incorporated into the actuation of the air jet so that the proper magazine 10 is affected by the air jet when the air blast occurs. The air jet merely deflects the defectively assembled magazine 10 into a separate bin (not shown).

The testing head at station 7 tests the integrity of hinge web 64 and ribs 68 (FIG. 2) by forcing the three spaced probe members 434, 436, and 438 into tapered recess 80 so as to spread the blade support platform 42 and the adjusting element 72 to flex hinge web 64. As further described below, the resistance to flexure of hinge web 64 indicates its structural soundness.

The width of the tapered recess 80 at its narrow end is approximately 0.025 inch, surface 76 is tapered at an angle of about 5° and surface 78 is tapered at an angle of about 2° so that the angle between surfaces 76 and 78 is about 7°. The depth of the recess is about 0.280 inch and the recess is about 1½ inches long.

The hinge structure of the magazine (web 64) offers greater resistance to deflection under the influence of a probe tip in the center of magazine 10 then at the ends. This is due, in part, to the engagement of pins 38 with apertures 36 in guide plate 26. For this reason the center probe end 470 has a greater stressing dimension that the exterior probe ends 468 and 472. For this same reason the force exerted by the middle spring 448 is greater than that for the two outer springs; the specific values being 21 oz. for the middle spring and 12 oz. for each outer springs.

The relative downward motion of the testing head causes the insertion of probe tips 468, 470, and 472 into tapered recess 80. The insertion is limited by the lip 476 of stop block 474 which engages surface 73 (see FIG. 1) of razor blade magazine 10. For the embodiment illustrated, a structurally sound hinge web 64 offers sufficient resistance to insertion of the probe tips into tapered recess 80 to the extent permitted by lip 476 of stop block 474 for the probes to be forced upward so that contacts 458 engage tips 460 of studs 462, thereby closing the circuits between leads 454 and 464. A weakened hinge web caused for example by one or more broken ribs 68, will offer less resistance to the insertion of a probe tip, and consequently the probe does not move upward a distance sufficient for contact 458 to engage the corresponding stud tip 460. The failure to make an electrical connection between leads 454 and 464 when there is a defective hinge web 64 is used to stop the machine and to signal the presence of a defective hinge web. The distance between lip 476 of stop block 474 and the extreme lower ends of probe tips 468, 470, and 472 is adjusted to avoid overinsertion of the probes into the tapered recess 80 and resultant contact of points 458 with tip 460 of stud 462 even when the hinge web 64 is defective. As with the detection of a defective assembly at station 6, an indication of a defective hinge web 64 is retained in a conventional shift register (not shown). The registers associated with stations 6 and 7 have three and two stages, respectively, and shifting between stages is initiated by a cam switch (not shown) once during each cycle of the turret indexing cam (cam 11, FIG. 29). By means of conventional circuitry, the contents stored in the final stage of the three stage shift register will control the operation of the air jet which deflects the magazine being removed at station 8 into a separate bin if defectively assembled. A defective hinge indication from the final stage of the two stage shift register can override the indication from the three stage register and cause the stoppage of the machine while the magazine is still held by the operative head at station 8 and the illumination of an indicator light on the operator's control panel. This permits the manual removal of the structurally defective magazine.

After the inspections the fully assembled magazine 10 is removed from the nest assembly 101 at station 8.

The vacuum supply is sequenced with the vacuum being applied only after the unlatching and unclamping actions (cam 24, function Y) have taken place. With the operative head positioned above the magazine 10, the head is lowered (cam 23, function W) until the vacuum cups assembly seal off on the tray 12. The unlatched and unclamped magazine 10 and tray 12 is then lifted (cam 23, function W') and transferred (cam 22, function V) to a position vertically above the chute 126 which leads to the assembled magazine bin. The operative head is then lowered (cam 23, function X) and the vacuum is removed and the blast of air pressure is supplied. A cam switch (not shown) energizes a solenoid valve to accomplish this, This air blast insures that the magazine 10 will drop immediately to the chute 126 to guarantee proper timing of the magazine 10 as it slides down the chute 126, as is necessary for the proper operation of the air jets located along the sides of the shoot which divert improperly assembled magazine 10 from the assembled parts bin.

Vacuum switch 498 (see FIG. 28) and two cam switches (not shown) cooperate to actuate a machine brake if the operative head either should fail to remove the assembled magazine 10 from the nest assembly 101 or should fail to deposit the magazine onto the chute 126, in a manner analogous to that at stations 3 and 5 as discussed above.

While a particular embodiment has been described and shown in the accompanying drawings, other embodiments will occur to those skilled in the art and are within following claims.

What I claim is:

1. Apparatus for the assembly of first and second components which require a small temporary relative rotation for proper assembly, said first component having a latching structure for engagement with said second component, comprising a clamping mechanism for clamping said first component such that said latching structure is exposed, an assembly head mounted for movement between locations adjacent to and remote from said clamping mechanism and for rotation about a pivot axis and constructed to support and retain said second component in an orientation suitable for rotative assembly with said first component, and a deflection member;

said assembly head being rotatively biased, said assembly head including a pivoted actuator arm mounted so as to strike said deflection member as said assembly head moves between said locations remote from and adjacent to said clamping mechanism and to thereby cause a rotation of said assembly head about said axis, and said assembly head also including actuator arm biasing means and a locking member which cooperate to pivot said actuator arm away from said deflection member after a predetermined angle of rotation of said assembly head and second component has occurred.

2. The apparatus as claimed in claim 1 wherein said deflection member comprises a roller mounted upon said clamping mechanism and said actuator arm includes a foot portion having a bevelled surface for contact with said roller.

3. The apparatus as claimed in claim 2 wherein there is also provided locking member biasing means and wherein said locking member is slidably mounted in said assembly head, has a foot portion comprising a first and a second projection, and cooperates with said locking member biasing means to engage said foot portion of said actuator arm with said first projection thereby to prevent rotation of said actuator arm under the influence of said actuator arm biasing means.

4. The apparatus as claimed in claim 3 wherein said second projection is mounted to strike said roller subsequent to the striking of said roller by said bevelled surface of said foot portion of said actuator arm, thereby to move said locking member against the influence of said locking member biasing means whereby said first projection may be disengaged from said foot portion of said actuator arm.

5. The apparatus as claimed in claim 4 wherein said actuator arm biasing means and said locking member biasing means comprise compression springs.

6. The apparatus as claimed in claim 5 wherein the direction of slidability of said locking member in said assembly head is substantially perpendicular to the initial motion of said foot portion of said actuator arm as said actuator arm pivots under the influence of said actuator arm biasing means.

7. The apparatus as claimed in claim 1 wherein said first component comprises an adjustment lever for a razor blade magazine adjustable geometry mechanism, said second component comprises a guide plate for said razor blade magazine adjustable geometry mechanism, there is provided a third component comprising a razor blade magazine having an aperture into which said adjustment lever is inserted and above which said latching structure protrudes; said guide plate having an aperture for receiving said latching structure, said assembly head including vacuum means which retain said guide plate thereto.

8. The apparatus as claimed in claim 7 wherein said vacuum means comprises a rubber element having a channel therein which is in communication with a source of vacuum and wherein said assembly head also includes a plurality of projecting pins adjacent the sides of a guide plate retained on said rubber element which constrain said guide plate to rotate with said assembly head.

9. The apparatus as claimed in claim 8 wherein said guide plate includes at least one additional aperture sized for engagement with a like number of projecting pins on the razor blade magazine and wherein said assembly head includes a like number of engagement pins which are aligned with said apertures and pins and which bear upon said guide plate whereby engagement of said projecting pins on said magazine with said additional apertures occurs.

10. The apparatus as claimed in claim 9 wherein said predetermined angle is about 8°.

11. Apparatus for the assembly of an adjustment lever having a latching structure formed thereon and a guide plate having an aperture therein with a partially preassembled razor comprising:

a turret mounted for rotation;

means for rotating said turret to predetermined rotational orientations;

at least one nest element mounted upon said turret constructed to receive and retain in predetermined orientations said adjustment lever and said partially preassembled magazine, a clamping mechanism for retaining said adjustment lever such that said latching structure is exposed;

first, second, third, and fourth operative stations at locations which are fixed relative to said turret and are adjacent the locations of said element when said turret is in one of said predetermined rotational orientations, said first, second, third, and fourth operative stations including transport apparatus mounted for motion between a first position adjacent said nest element and a second position remote therefrom;

a first feeder mechanism adjacent said first operative station to supply said adjustment levers, a second feeder mechanism adjacent said second operative station to supply said partially preassembled magazines, and a third feeder mechanism adjacent said third operative station to supply said guide plates, said first, second, and third feeder mechanisms having ultimate delivery locations for said adjustment levers, partially preassembled magazines, and guide plates respectively;

said second position of each said transport apparatus at said first, second, and third operative stations being adjacent said ultimate delivery locations of said first, second, and third feeder mechanisms respectively;

said first transport apparatus supporting a first operative head constructed to receive said adjustment lever from said first feeder mechanism and transport it to said nest element;

said second transport apparatus supporting a second operative head constructed to receive said partially preassembled magazine from said second feeder mechanism, to transport it to said nest element, and to deposit it therein in a predetermined orientation with respect to said adjustment lever;

said third transport apparatus supporting a third operative head comprising an assembly head constructed to receive a guide plate, to transport it to said nest element and to engage it with said adjustment lever by means of the rotative deflection and return of at least one of said third operative head and said nest element; and said fourth transport apparatus supporting a fourth operative head constructed to remove said assembled magazine from said nest element.

12. The apparatus as claimed in claim 11 wherein only one of said third operative head and said nest assembly is rotatably deflected and wherein there is also provided a deflection member, said one being rotatively biased, and including a pivoted actuator arm mounted so as to strike said deflection member as said assembly head moves between said positions remote from an adjacent to said nest element to thereby cause a rotation of said one, said one also including actuator arm biasing means and a locking member which cooperate to pivot said actuator arm away from deflection member after a predetermined angle of rotation has occurred.

13. The apparatus as claimed in claim 12 wherein said deflection member comprises a roller and said actuator arm includes a foot portion having a bevelled surface for contact with said roller.

14. The apparatus as claimed in claim 13 wherein there is provided locking member biasing means and wherein said locking member is slidably mounted in said one, has a foot portion comprising a first and a second projection, and cooperates with said locking member biasing means to engage said foot portion of said actuator arm with said first projection thereby to prevent rotation of said actuator arm under the influence of said actuator arm biasing means, said second projection being mounted to strike said roller subsequent to the striking by of said roller said bevelled surface of said foot portion of said actuator arm, thereby to move said locking member against the influence of said locking member biasing means whereby said first projection may be disengaged from said foot portion of said actuator arm.

15. The apparatus as claimed in claim 14 wherein said actuator arm biasing means and said locking member biasing means comprise compression springs.

16. The apparatus as claimed in claim 15 wherein the direction of slidability of said locking member in said one is substantially perpendicular to the initial motion of said foot portion of said actuator arm as said actuator arm pivots under the influence of said actuator arm biasing means.

17. The apparatus as claimed in claim 16 wherein said assembly head includes vacuum means to retain said guide plate comprising a rubber element having a channel therein which is in communication with a source of vacuum and wherein said assembly head also includes a plurality of restraining pins adjacent the sides of a guide plate.

18. The apparatus as claimed in claim 17 wherein said guide plate includes at least one additional aperture sized for engagement with a like member of projecting pins on the razor blade magazine and wherein said assembly head includes a like member of engagement pins which are aligned with said apertures and pins and which bear upon said guide plate thereby to cause engagement of said projecting pins on said magazine with said additional apertures.

19. The apparatus as claimed in claim 18 wherein said one is said assembly head.

20. The apparatus as claimed in claim 11 wherein there is also provided at least one testing station located between said third and fourth operative stations.

21. The apparatus as claimed in claim 20 wherein there are two such testing stations one of which tests for remediable defects and one of which tests for irremediable defects, each of said testing stations including circuitry which cooperates with said fourth operative station to segregate, after removal from said nest element, nondefective magazines, remediably defective magazines, and irremediably defective magazines.

22. The apparatus as claimed in claim 21 wherein said testing station which tests for remediable defects is constructed to sense the improper engagement of said guide plate with both said latching structure of said adjustment lever and said partially preassembled magazine.

23. The apparatus as claimed in claim 22 wherein said guide plate is made from an electrically conducting material and has two additional apertures therein positioned for engagement with mating pins on an adjusting element of said partially preassembled magazine and wherein said testing station which tests for remediable defects includes a first probe number mounted for contact with said guide plate, a second probe member mounted so as to contact said guide plate only if said guide plate is improperly angularly aligned with said adjustment lever and partially preassembled magazine, and third and fourth probe members mounted so as to contact a said guide plate only if said additional apertures fail to engage said mating pins on said adjusting element of said partially preassembled magazine.

24. The apparatus as claimed in claim 11 wherein there is also provided an adjustment lever detector between said first and second operative stations mounted to detect the presence of a properly clamped adjustment lever in said nest element.

25. The apparatus as claimed in claim 11 wherein there are eight nest elements symmetrically spaced about the periphery of said turret, said apparatus comprising eight machine stations, four of which comprise said first, second, third, and fourth operative stations, thereby to permit the simultaneous operation of each of said operative stations upon a plurality of said magazines.